(12) United States Patent
Shi et al.

(10) Patent No.: US 11,933,701 B2
(45) Date of Patent: *Mar. 19, 2024

(54) DEVICES AND METHODS FOR SAMPLE ANALYSIS WITH SERIAL DILUTION

(71) Applicant: CytoChip, Inc., Irvine, CA (US)

(72) Inventors: Wendian Shi, Irvine, CA (US); Yuan Gao, Irvine, CA (US); Yuzhe Ding, Irvine, CA (US)

(73) Assignee: CytoChip Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,800

(22) Filed: Apr. 29, 2023

(65) Prior Publication Data

US 2023/0266205 A1 Aug. 24, 2023

Related U.S. Application Data

(63) Continuation of application No. 16/971,623, filed as application No. PCT/US2019/019555 on Feb. 26, 2019, now Pat. No. 11,674,869.

(60) Provisional application No. 62/635,996, filed on Feb. 27, 2018.

(51) Int. Cl.
*G01N 1/20* (2006.01)
*G01N 1/38* (2006.01)

(52) U.S. Cl.
CPC .............. *G01N 1/2035* (2013.01); *G01N 1/38* (2013.01); *G01N 2001/2057* (2013.01)

(58) Field of Classification Search
CPC .......... G01N 1/2035; G01N 1/38; G01N 2001/2057; G01N 15/0205; G01N 15/1404; G01N 15/1459; G01N 2015/1006; G01N 2015/1402; G01N 2015/1493; B01L 2200/0684; B01L 2300/0864; B01L 2300/0867; B01L 2300/161; B01L 2400/0487; B01L 2400/0688; B01L 3/502738
See application file for complete search history.

(56) References Cited

U.S. PATENT DOCUMENTS

| | | | |
|---|---|---|---|
| 2007/0025875 A1* | 2/2007 | Peters | B01L 3/502723 422/400 |
| 2008/0085560 A1* | 4/2008 | Ekberg | G01N 33/5094 436/63 |
| 2015/0233751 A1* | 8/2015 | Blake | B01L 3/502715 250/577 |
| 2016/0361715 A1* | 12/2016 | Shi | B01L 3/502738 |

* cited by examiner

*Primary Examiner* — John Fitzgerald
*Assistant Examiner* — Truong D Phan
(74) *Attorney, Agent, or Firm* — AVEK IP, LLC

(57) ABSTRACT

Devices and methods for analyzing a sample are disclosed. In various embodiments, the present disclosure provides devices and methods for preparing a serial dilution of a sample. In various embodiments, the present disclosure provides devices and methods for preparing a serial dilution of a sample and conducting sample analysis. In various embodiments, the present disclosure provides a cartridge device and a reader instrument device. The reader instrument device receives, operates, and/or actuates the cartridge device to prepare a serial dilution of a sample and conduct sample analysis.

20 Claims, 21 Drawing Sheets

DEVICES AND METHODS FOR SAMPLE ANALYSIS WITH SERIAL DILUTION

CROSS REFERENCE TO RELATED APPLICATIONS

This application is a continuation of U.S. application Ser. No. 16/971,623, filed on Aug. 20, 2020, which is the United State national stage entry under 37 U.S.C. 371 of PCT/US2019/019555 filed on Feb. 26, 2019, which claims priority to U.S. Provisional Application No. 62/635,996 filed on Feb. 27, 2018, the disclosure of which are incorporated by reference herein in their entireties.

FIELD OF THE DISCLOSURE

The disclosure relates generally to medicine, diagnostics, and devices. More specifically, the disclosure relates to devices and methods for sample analysis with serial dilution.

BACKGROUND

All publications cited herein are incorporated by reference in their entireties to the same extent as if each individual publication or patent application was specifically and individually indicated to be incorporated by reference. The following description includes information that may be useful in understanding the present disclosure. It is not an admission that any of the information provided herein is prior art or relevant to the present disclosure, or that any publication specifically or implicitly referenced is prior art.

In general, sample analysis is a crucial step in in vitro diagnostics. Various types of samples can be analyzed, including but not limited to gas samples such as breaths, liquid samples such as body fluids (e.g., blood, lymph, sweat, tear, sperm, saliva, and urine, et cetera), and solid samples such as nucleic acid extractions or tumor biopsies, et cetera. When the analysis target (e.g., cells, particles, biological molecules, and metabolites) in a sample has a high concentration, there is a significant possibility that measurement errors may be introduced during sample analysis. Therefore, a dilution of the sample becomes necessary to reduce measurement errors. A one-step dilution often needs a significant amount of reagent to dilute the sample for accurate sample analysis. In contrast, a serial dilution of the sample can reduce the necessary amount of reagent and hence enables easier and more practical operations for sample analysis.

Various types of sample analysis technologies can used, including but not limited to cytometry, spectrometry (e.g., mass spectrometry, optical spectrometry, and ion-mobility spectrometry, et cetera), and chemiluminescence. Cytometry is a technology for measuring characteristics of cells, and it is widely used for testing biological or medical samples. Cytometry can measure individual cells to achieve accurate characterization. However, when the cell concentration in a sample is high, there is a significant possibility that multiple cells are characterized together as one and dilution of the sample becomes necessary to reduce this possibility. In some situations, a one-step dilution would use a significant amount of diluent to dilute a high cell concentration, and a serial dilution can reduce the necessary amount of diluent.

One example of cytometry analysis that benefits from a serial dilution is a Complete Blood Count (CBC) test. A CBC test may measure the concentration of white blood cells (WBCs), red blood cells (RBCs) and platelets (PLTs) in a blood sample. In a blood sample (e.g., a human blood sample) the concentrations of RBCs and PLTs are usually high (e.g., 4-6 million RBCs and 0.15-0.5 million PLTs in a microliter blood), and a serial dilution is often needed to dilute the blood sample to achieve accurate measurement.

Additionally, a CBC test may further measure parameters such as hemoglobin concentration and hematocrit of a sample. Sometimes it may further classify WBCs into different subtypes, such as lymphocytes, monocytes, neutrophils, eosinophils, and basophils, and measure the concentrations of those subtypes. Sometimes a CBC test may further measure other parameters such as hemoglobin, hematocrit, reticulocyte count, nucleated RBC count, RBC indices (e.g., mean corpuscular volume, mean corpuscular hemoglobin, mean corpuscular hemoglobin concentration, and red cell distribution width, et cetera), and platelet indices (e.g., mean platelet volume, plateletcrit, platelet distribution width, and platelet large cell ratio, et cetera.)

Previously, a serial dilution for sample analysis such as cytometry analysis (e.g., a CBC test) is often done by a technician (e.g., through manually pipetting) or by an automated machine (e.g., machines with a built-in fluidic system). The fluidic system for dilution in these automated machines is usually designed for continuous use instead of disposable use, and would require frequent cleaning (e.g., after measuring each sample) and periodic maintenance (e.g., bleaching biological residues). Therefore, these machines are mostly limited to use in centralized laboratories. For applications where simplicity of use is important, such as point-of-care testing near patients, a serial dilution in a disposable cartridge device is preferred.

U.S. Pat. Nos. 5,077,017 and 5,104,813 described designs of cartridge devices for a serial dilution, which relies on a capillary force to hold the meniscus of a sample at a fluidic junction and the gravity force to bring the meniscus of a diluent to contact the sample meniscus at the fluidic junction. In this way, the sum of the capillary force and the gravity force can bring the sample and the diluent to pass the fluidic junction into a chamber for mixing. The operation of this design is vulnerable to any unexpected air gap between the sample meniscus and the diluent meniscus at the fluidic junction, where the air gap would prevent the direct contact between the two meniscuses. The air gap can be introduced through many sources, for example, the timing of the sample and the diluent to reach the fluidic junction, bubbles in the sample (e.g., bubbles in blood collected from a finger prick) or bubbles in the diluent (e.g., bubbles generated by shaking during transportation).

U.S. Pat. Nos. 9,440,233 and 9,808,802 described cartridge designs for a serial dilution, which relies on a rotating valve to bring the sample and the diluent together to form a mixture.

U.S. patent application Ser. No. 12/029,480 described cartridge designs for a serial dilution, which relies on rotation of the cartridge device and a centrifugal force to bring the sample and the diluent together to form a mixture.

U.S. Pat. Nos. 8,383,043, 8,518,328, 8,663,583, 8,741,235, and 8,980,635 described cartridge devices for cytometry analysis or a CBC test. However, they did not teach a serial dilution.

U.S. Pat. Nos. 7,771,658 and 8,573,033 described cartridge devices for a CBC test, which relies on a rotating valve for operation. However, they did not teach a serial dilution.

U.S. Pat. No. 9,625,357 described cartridge devices for a CBC test, but did not teach a serial dilution.

U.S. Pat. No. 5,627,041 described cartridge devices to meter samples for biological assays but did not teach a serial dilution.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

Various embodiments of the present disclosure provide a method for analyzing samples. The method includes: mixing a sample with a first reagent to form a sample mixture 1; mixing a first portion of the sample mixture 1 with a second reagent to form a sample mixture 2; and measuring the sample mixture 1, or sample mixture 2, or both to analyze cells, particles, or analytes, or a combination thereof. In various embodiments, the method further includes mixing a second portion of the sample mixture 1 with a third reagent to form a sample mixture 3 and measuring the sample mixture 3 to analyze cells, particles, or analytes, or a combination thereof. In various embodiments, the method further includes metering a designated volume of the sample mixture 1 to obtain the first portion of the sample mixture 1. In various embodiments, the method further includes metering a designated volume of the sample mixture 1 to obtain the second portion of the sample mixture 1.

Various embodiments of the present disclosure provide a device for analyzing samples. In various embodiments, the device includes a fluidic cartridge. In various embodiments, the fluidic cartridge includes: a first chamber configured for receiving a sample and a first reagent to form a sample mixture 1; and a metering chamber connected to the first chamber and configured for metering a first portion of the sample mixture 1. In various embodiments, the fluidic cartridge further includes a fluidic structure configured for mixing the first portion of the sample mixture 1 with a second reagent to form a sample mixture 2. In various embodiments, the fluidic cartridge further includes a fluidic structure configured for mixing a second portion of the sample mixture 1 with a third reagent to form a sample mixture 3.

Various embodiments of the present disclosure provide a method for analyzing samples. The method uses a fluidic cartridge as described herein and a reader instrument as described herein. The method includes: using a fluidic cartridge a described herein to receive a sample; and using a reader instrument as described herein to perform sample analysis of the sample. In some embodiments, the fluidic cartridge receives the sample before the fluidic cartridge is placed into the reader instrument. In other embodiments, the fluidic cartridge receives the sample after the fluidic cartridge is placed into the reader instrument. Various embodiments of the present disclosure provide a method for analyzing samples. The method includes using a fluidic cartridge to receive a sample; and placing the fluidic cartridge into a reader instrument to perform sample analysis of the sample. Various embodiments of the present disclosure provide a method for analyzing samples. The method includes placing a fluidic cartridge into a reader instrument; using the fluidic cartridge to receive a sample; and using the reader instrument to perform sample analysis of the sample.

Various embodiments of the present disclosure provide a method for analyzing samples. The method includes: using a fluidic cartridge to receive a sample and a first reagent to form a sample mixture 1; using a metering chamber in the fluidic cartridge to meter a first portion of the sample mixture 1; using the fluidic cartridge to mix the first portion of the sample mixture 1 with a second reagent to form a sample mixture 2; and using a reader instrument to measure a signal from the sample mixture 1, or sample mixture 2, or both in the fluidic cartridge. In various embodiments, the method further includes using the fluidic cartridge to mix a second portion of the sample mixture 1 with a third reagent to form a sample mixture 3 and using the reader instrument to measure a signal from the sample mixture 3.

Various embodiments of the present disclosure provide devices and methods of serial dilutions for various types of sample analysis, including but not limited to cytometry analysis (e.g., a CBC test). In various embodiments, this disclosure describes dilution methods and fluidic diagrams to achieve a serial dilution in sample analysis (e.g., cytometry analysis and a CBC test). In various embodiments, this disclosure describes devices of fluidic cartridges to implement a serial dilution for sample analysis (e.g., cytometry analysis and a CBC test). In various embodiments, this disclosure describes a reagent storage unit for fluidic cartridge devices to increase their shelf life. In certain embodiments, a fluidic cartridge is received in a reader instrument for measurement operation and result readout. In addition to cytometry analysis and a CBC test, the described serial dilution methods, fluidic cartridge devices and reagent storage units are used for other measurements of a sample. Examples of other measurements include but are not limited to hemoglobin, hematocrit, reticulocyte count, nucleated RBC count, RBC indices (e.g., mean corpuscular volume, mean corpuscular hemoglobin, mean corpuscular hemoglobin concentration, and red cell distribution width, et cetera), and platelet indices (e.g., mean platelet volume, plateletcrit, platelet distribution width, and platelet large cell ratio, et cetera). Additionally, the devices and methods described herein are also used to analyze various types of samples, which include but are not limited to body fluids (e.g., blood, sweat, tear, and urine, et cetera), other fluid samples (e.g., cell suspension in a buffer or particle suspension in a buffer, et cetera), and other types of samples (e.g., nucleic acid extraction or tumor biopsies, et cetera). In various embodiments, the devices and methods described in this disclosure are also used to achieve metering of a sample mixture, serial dilution of a sample mixture, and various analysis of the samples.

BRIEF DESCRIPTION OF THE DRAWINGS

Illustrative embodiments of the present disclosure are described in detail below with reference to the figures.

DETAILED DESCRIPTION

Figure 1A:
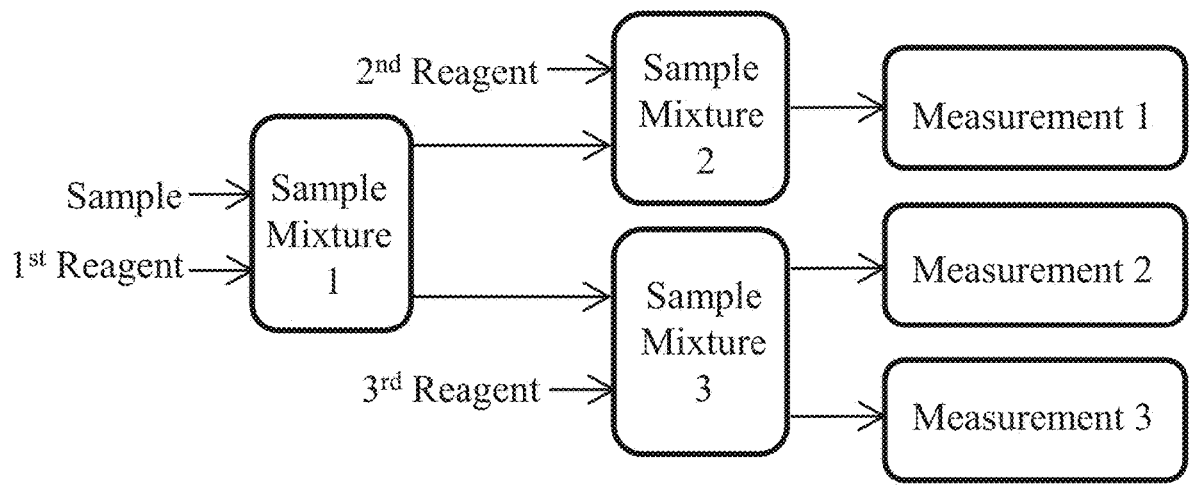
FIG. 1A is a block diagram illustrating the dilution sequence in a serial dilution for various sample analysis methods according to some embodiments of the disclosure.

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

All references cited herein are incorporated by reference in their entirety as though fully set forth. Unless defined otherwise, technical and scientific terms used herein have the same meaning as commonly understood by one of ordinary skill in the art to which this disclosure belongs. Tabeling, *Introduction to Microfluidics reprint edition*, Oxford University Press (2010); Nguyen et al., *Fundamentals and Applications of Microfluidics* 2$^{nd}$ ed., Artech House Incorporated (2006); van den Berg et al., *Microfluidics for Medical Applications*, Royal Society of Chemistry (2014); Gomez et al., *Biological Applications of Microfluidics* 1$^{st}$ ed., Wiley-Interscience (2008); and Colin et al., *Microfluidics* 1$^{st}$ ed., Wiley-ISTE (2010), provide one skilled in the art with a general guide to many of the terms used in the present application One skilled in the art will recognize many methods and materials similar or equivalent to those described herein, which could be used in the practice of the present disclosure. Other features and advantages of the disclosure will become apparent from the following detailed description, taken in conjunction with the accompanying drawings, which illustrate, by way of example, various features of embodiments of the disclosure. Indeed, the present disclosure is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this disclosure belongs. It should be understood that the present disclosure is not limited to the particular methodology, devices, systems, protocols, and reagents, et cetera, described herein and as such can vary. The definitions and terminology used herein are provided to aid in describing particular embodiments and are not intended to limit the claims.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," et cetera).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g.," is derived from the Latin exempli gratia and is used herein to indicate a non-limiting example. Thus, the abbreviation "e.g." is synonymous with the term "for example." No language in the specification should be construed as indicating any non-claimed element essential to the practice of the application.

Patent Application Nos. PCT/US17/59965, 15/803,133, PCT/US17/62765, 15/819,416, 62/504,866, PCT/US18/31893, 62/575,918, and PCT/US18/56725 are incorporated herein by reference in their entirety as if fully set forth.

Various embodiments of the present disclosure provide a method for analyzing samples. The method may include: mixing a sample with a first reagent to form a sample mixture 1; mixing a first portion of the sample mixture 1 with a second reagent to form a sample mixture 2; and measuring the sample mixture 1, or sample mixture 2, or both to analyze cells, particles, or analytes, or a combination thereof. In various embodiments, the method may further include mixing a second portion of the sample mixture 1 with a third reagent to form a sample mixture 3 and measuring the sample mixture 3 to analyze cells, particles, or analytes, or a combination thereof.

In various embodiments, a first chamber in a fluidic cartridge is used to mix the sample with the first reagent to form the sample mixture 1. In various embodiments, a fluidic structure in a fluidic cartridge is used to mix the first portion of the sample mixture 1 with a second reagent to form the sample mixture 2. In various embodiments, a fluidic structure in a fluidic cartridge is used to mix the second portion of the sample mixture 1 with a third reagent to form the sample mixture 3.

In various embodiments, the method may further include metering a designated volume of the sample mixture 1 to obtain the first portion of the sample mixture 1. In various embodiments, the method may further include metering a designated volume of the sample mixture 1 to obtain the second portion of the sample mixture 1. In various embodiments, a metering chamber and a driving mechanism are used to meter the first and/or second portion of the sample mixture 1.

In various embodiments, the method may further include forming a sample stream from a sample mixture and measuring cells, particles, or analytes, or a combination thereof, in the sample stream. In various embodiments, a flow cell is used to form the sample stream. In various embodiments, the sample mixture is any sample mixture in the fluidic cartridge. In some embodiments, the sample mixture is the sample mixture 1. In some embodiments, the sample mixture is the sample mixture 2. In some embodiments, the sample mixture is the sample mixture 3. In various embodiments, the sample mixture 2 is measured in the flow cell before the sample mixture 3 is measured in the flow cell.

In various embodiments, the method may further include using a reader instrument to measure cells, particles, or analytes, or a combination thereof, in the sample stream. In various embodiments, the cells measured by the reader instrument may include white blood cells (WBCs), red blood cells (RBCs), or platelets (PLTs), or a combination thereof. In various embodiments, the particles measured by the reader instrument may include lipid particles, beads, fluorescent beads, or magnetic beads, or a combination thereof. In various embodiments, the analytes measured by the reader instrument may include hemoglobin, proteins, or hormones, or a combination thereof.

In various embodiments, the sample mixture 2 is measured to analyze cells, RBCs, PLTs, particles, or analytes, or a combination thereof. In various embodiments, the sample mixture 3 is measured to analyze cells, WBCs, hemoglobin, particles, or analytes, or a combination thereof.

Various embodiments of the present disclosure provide a device for analyzing samples. In various embodiments, the device may include a fluidic cartridge. In various embodiments, the fluidic cartridge may include: a first chamber configured for receiving a sample and a first reagent to form a sample mixture 1; and a metering chamber connected to the first chamber and configured for metering a first portion of the sample mixture 1. In some embodiments, the first reagent is a liquid reagent. In other embodiments, the first reagent is a dry or dried reagent. In various embodiments, the osmolarity of the first reagent is about 140-160, 160-180, 180-200, 200-220, 220-240, 240-260, 260-280, 280-300, 300-320, 320-340, 340-360, 360-380, or 380-400 mOsm/L.

In various embodiments, the fluidic cartridge may further include a fluidic structure configured for mixing the first portion of the sample mixture 1 with a second reagent to form a sample mixture 2. In various embodiments, the fluidic structure may include a second chamber connected to the metering chamber. In various embodiments, the second chamber is configured for receiving the second reagent before the second reagent is mixed with the first portion of the sample mixture 1. In various embodiments, the fluidic structure may include a second chamber connected to the metering chamber and configured for receiving the second reagent before the second reagent is mixed with the first portion of the sample mixture 1. In various embodiments, the connection between the metering chamber and the second chamber may include a valve, a passive valve, or an active valve. In various embodiments, the fluidic structure may include a second chamber connected to the first chamber. In various embodiments, the fluidic cartridge may further include a fluidic structure configured for mixing a second portion of the sample mixture 1 with a third reagent to form a sample mixture 3.

In various embodiments, the metering chamber may include a surface and at least a portion of the surface is hydrophilic. In various embodiments, the metering chamber is connected to a driving mechanism configured for driving the sample mixture 1 to contact a hydrophilic surface in the metering chamber. In various embodiments, the metering chamber may include a capillary valve. In various embodiments, the metering chamber is connected to a venting port. In various embodiments, the metering chamber is connected to a chamber having a venting port. In various embodiments, the connection between the metering chamber and the chamber having a venting port may include a valve. In some embodiments, the valve is a capillary valve. In some embodiments, the valve is a passive valve, or an active valve, or a combination thereof.

In various embodiments, the device may further include a reader instrument that is configured to receive the fluidic cartridge and perform sample analysis. In various embodiments, the reader instrument is configured to receive the fluidic cartridge in such an orientation that gravity pulls a fluid inside a chamber of the fluidic cartridge away from the chamber's venting port. In various embodiments, the reader instrument is configured to receive the fluidic cartridge in such an orientation that gravity pulls a fluid inside a chamber of the fluidic cartridge away from the chamber's venting port and towards the chamber's bottom.

In various embodiments, the reader instrument may include a driving mechanism. In various embodiments, the driving mechanism is a pneumatic force. In various embodiments, the driving mechanism is connected to the metering chamber. In various embodiments, the driving mechanism is configured for driving the sample mixture 1 to contact a hydrophilic surface in the metering chamber.

In various embodiments, the reader instrument is configured to apply the driving mechanism to the fluidic cartridge to meter the first portion of the sample mixture 1 in the metering chamber. In various embodiments, the driving mechanism is started to drive the sample mixture 1 to contact a hydrophilic surface in the metering chamber. In various embodiments, the driving mechanism is stopped after the sample mixture 1 contacts a hydrophilic surface in the metering chamber. In various embodiments, the driving mechanism is stopped after the sample mixture 1 contacts a hydrophilic surface in the metering chamber and before the sample mixture 1 reaches a capillary valve in the metering chamber.

In various embodiments, the fluidic cartridge may further include a reagent storage unit that may include a storage chamber configured for accommodating a fluid and a valve with a breakable bonding. In various embodiments, the fluidic cartridge may further include two reagent storage units, and each reagent storage unit may include a storage chamber configured for accommodating a fluid and a valve with a breakable bonding. In various embodiments, the two valves in the two reagent storage units are opened together after the fluidic cartridge is placed into the reader instrument. In various embodiments, a storage chamber described herein is configured for accommodating the first reagent and/or the second reagent. In various embodiments, the fluid accommodated in a storage chamber as described herein is the first reagent and/or the second reagent.

In various embodiments, the fluidic cartridge may further include a flow cell configured to form a sample stream from a sample mixture in the fluidic cartridge. In various embodiments, the sample mixture is any sample mixture in the fluidic cartridge. In some embodiments, the sample mixture is the sample mixture 1. In some embodiments, the sample mixture is the sample mixture 2. In some embodiments, the sample mixture is the sample mixture 3.

Various embodiments of the present disclosure provide a method for analyzing samples. The method uses a fluidic cartridge as described herein and a reader instrument as described herein. The method may include using a fluidic cartridge a described herein to receive a sample; and using a reader instrument as described herein to perform sample analysis of the sample. In some embodiments, the fluidic cartridge receives the sample before the fluidic cartridge is placed into the reader instrument. In other embodiments, the fluidic cartridge receives the sample after the fluidic cartridge is placed into the reader instrument.

In various embodiments, the method may include using a fluidic cartridge to receive a sample; and placing the fluidic cartridge into a reader instrument to perform sample analysis of the sample. In various embodiments, the fluidic cartridge may include: a first chamber configured for receiving a sample and a first reagent to form a sample mixture 1; and a metering chamber connected to the first chamber and configured for metering a first portion of the sample mixture 1. In some embodiments, the first reagent is a liquid reagent. In other embodiments, the first reagent is a dry or dried reagent.

In various embodiments, the method may include placing a fluidic cartridge into a reader instrument; using the fluidic cartridge to receive a sample; and using the reader instrument to perform sample analysis of the sample. In various embodiments, the fluidic cartridge may include: a first chamber configured for receiving a sample and a first reagent to form a sample mixture 1; and a metering chamber connected to the first chamber and configured for metering a first portion of the sample mixture 1. In some embodiments, the first reagent is a liquid reagent. In other embodiments, the first reagent is a dry or dried reagent.

In various embodiments, the osmolarity of the first reagent is about 140-160, 160-180, 180-200, 200-220, 220-240, 240-260, 260-280, 280-300, 300-320, 320-340, 340-360, 360-380, or 380-400 mOsm/L.

In various embodiments, the metering chamber may include a surface and at least a portion of the surface is hydrophilic. In various embodiments, the metering chamber is connected to a driving mechanism configured for driving the sample mixture 1 to contact a hydrophilic surface in the metering chamber. In various embodiments, the metering chamber may include a capillary valve. In various embodiments, the metering chamber is connected to a venting port. In various embodiments, the metering chamber is connected to a chamber having a venting port. In various embodiments, the connection between the metering chamber and the chamber having a venting port may include a valve. In some embodiments, the valve is a capillary valve. In some embodiments, the valve is a passive valve, or an active valve, or a combination thereof.

In various embodiments, the reader instrument applies a driving mechanism to the fluidic cartridge to meter the first portion of the sample mixture 1 in the metering chamber. In various embodiments, the driving mechanism is a pneumatic force. In various embodiments, the driving mechanism is started to drive the sample mixture 1 to contact a hydrophilic surface in the metering chamber. In various embodiments, the driving mechanism is stopped after the sample mixture 1 contacts a hydrophilic surface in the metering chamber. In various embodiments, the driving mechanism is stopped after the sample mixture 1 contacts a hydrophilic surface in the metering chamber and before the sample mixture 1 reaches a capillary valve in the metering chamber.

In various embodiments, the fluidic cartridge is placed into the reader instrument in such an orientation that gravity pulls a fluid inside a chamber of the fluidic cartridge away from the chamber's venting port. In various embodiments, the fluidic cartridge is placed into the reader instrument in such an orientation that gravity pulls a fluid inside a chamber of the fluidic cartridge away from the chamber's venting port and towards the chamber's bottom.

In various embodiments, the sample mixture 1 is removed from the first chamber after the first portion of the sample mixture 1 is metered.

In various embodiments, the fluidic cartridge may further include a fluidic structure configured for mixing the first portion of the sample mixture 1 with a second reagent to form a sample mixture 2. In various embodiments, the fluidic structure may include a second chamber connected to the metering chamber. In various embodiments, the second chamber is configured for receiving the second reagent before the second reagent is mixed with the first portion of the sample mixture 1. In various embodiments, the fluidic structure may include a second chamber connected to the metering chamber and configured for receiving the second reagent before the second reagent is mixed with the first portion of the sample mixture 1. In various embodiments, the connection between the metering chamber and the second chamber may include a valve, a passive valve, or an active valve. In various embodiments, the fluidic structure may include a second chamber connected to the first chamber.

In various embodiments, the fluidic cartridge is configured for mixing a second portion of the sample mixture 1 with a third reagent to form a sample mixture 3. In various embodiments, the third reagent is a dry or dried reagent.

In various embodiments, the fluidic cartridge may further include a flow cell configured to form a sample stream from a sample mixture in the fluidic cartridge. In various embodiments, the fluidic cartridge may further include a flow cell configured to form a sample stream from a sample mixture in the fluidic cartridge, and the reader instrument measures cells, particles, or analytes, or a combination thereof in the sample stream. In various embodiments, the sample mixture is any sample mixture in the fluidic cartridge. In some embodiments, the sample mixture is the sample mixture 1. In some embodiments, the sample mixture is the sample mixture 2. In some embodiments, the sample mixture is the sample mixture 3. In various embodiments, the sample mixture 2 is measured in the flow cell before the sample mixture 3 is measured in the flow cell.

In various embodiments, the cells measured by the reader instrument may include white blood cells (WBCs), red blood cells (RBCs), or platelets (PLTs), or a combination thereof. In various embodiments, the particles measured by the reader instrument may include lipid particles, beads, fluorescent beads, or magnetic beads, or a combination thereof. In various embodiments, the analytes measured by the reader instrument may include hemoglobin, proteins, or hormones, or a combination thereof.

In various embodiments, the sample mixture 2 is measured to analyze cells, RBCs, PLTs, particles, or analytes, or a combination thereof. In various embodiments, the sample mixture 3 is measured to analyze cells, WBCs, hemoglobin, particles, or analytes, or a combination thereof.

In various embodiments, the fluidic cartridge may further include a reagent storage unit that may include a storage chamber configured for accommodating a fluid and a valve with a breakable bonding. In various embodiments, the fluidic cartridge may further include two reagent storage units, and each reagent storage unit may include a storage chamber configured for accommodating a fluid and a valve with a breakable bonding. In various embodiments, the two valves in the two reagent storage units are opened together after the fluidic cartridge is placed into the reader instrument. In various embodiments, a storage chamber described herein is configured for accommodating the first reagent and/or the second reagent. In various embodiments, the fluid accommodated in a storage chamber as described herein is the first reagent and/or the second reagent.

Various embodiments of the present disclosure provide a method for analyzing samples. The method may include: using a fluidic cartridge to receive a sample and a first reagent to form a sample mixture 1; using a metering chamber in the fluidic cartridge to meter a first portion of the sample mixture 1; using the fluidic cartridge to mix the first portion of the sample mixture 1 with a second reagent to form a sample mixture 2; and using a reader instrument to measure a signal from the sample mixture 1, or sample mixture 2, or both in the fluidic cartridge.

In various embodiments, the method may further include using the fluidic cartridge to mix a second portion of the sample mixture 1 with a third reagent to form a sample mixture 3. In various embodiments, the third reagent may include an RBC lysing compound. In various embodiments, the method may further include using the reader instrument to measure a signal from the sample mixture 3.

In some embodiments, the reader instrument measures the sample mixture 2 to analyze cells, RBCs, PLTs, particles, or analytes, or a combination thereof. In some embodiments, the reader instrument measures the sample mixture 3 to analyze cells, WBCs, hemoglobin, particles, or analytes, or a combination thereof. In various embodiments, the method may further include measuring the sample mixture 2 in a flow cell in the fluidic cartridge before measuring the sample mixture 3 in the flow cell of the fluidic cartridge.

In various embodiments, the reader instrument applies a driving mechanism to the metering chamber to meter the first portion of the sample mixture 1. In various embodiments, the driving mechanism is a pneumatic force. In various embodiments, the driving mechanism is started to drive the sample mixture 1 to contact a hydrophilic surface in the metering chamber. In various embodiments, the driving mechanism is stopped after the sample mixture 1 contacts a hydrophilic surface in the metering chamber. In various embodiments, the driving mechanism is stopped after the sample mixture 1 contacts a hydrophilic surface in the metering chamber and before the sample mixture 1 reaches a capillary valve in the metering chamber.

In various embodiments, the fluidic cartridge is placed into the reader instrument. In various embodiments, the fluidic cartridge is placed into the reader instrument in such an orientation that gravity pulls a fluid inside a chamber of the fluidic cartridge away from the chamber's venting port.

In various embodiments, the fluidic cartridge is placed into the reader instrument in such an orientation that gravity pulls a fluid inside a chamber of the fluidic cartridge away from the chamber's venting port and towards the chamber's bottom.

In various embodiments, the osmolarity of the first reagent is about 140-160, 160-180, 180-200, 200-220, 220-240, 240-260, 260-280, 280-300, 300-320, 320-340, 340-360, 360-380, or 380-400 mOsm/L.

In various embodiments, an RBC lysing compound is introduced into a chamber, and then the first portion of the sample mixture 1 and the second reagent are introduced into the chamber to form the sample mixture 2.

In various embodiments, the method may further include using a flow cell in the fluidic cartridge to form a sample stream from a sample mixture in the fluidic cartridge, and using the reader instrument to measure cells, particles, or analytes, or a combination thereof in the sample stream. In various embodiments, the sample mixture is any sample mixture in the fluidic cartridge. In some embodiments, the sample mixture is the sample mixture 1. In some embodiments, the sample mixture is the sample mixture 2. In some embodiments, the sample mixture is the sample mixture 3. In various embodiments, the sample mixture 2 is measured in the flow cell before the sample mixture 3 is measured in the flow cell. In various embodiments, the cells measured by the reader instrument may include white blood cells (WBCs), red blood cells (RBCs), or platelets (PLTs), or a combination thereof. In various embodiments, the particles measured by the reader instrument may include lipid particles, beads, fluorescent beads, or magnetic beads, or a combination thereof. In various embodiments, the analytes measured by the reader instrument may include hemoglobin, proteins, or hormones, or a combination thereof.

In various embodiments, the method may further include using the reader instrument to measure cells, RBCs, PLTs, particles, or analytes, or a combination thereof in the sample stream formed from the sample mixture 2. In various embodiments, the method may further include using the reader instrument to measure cells, WBCs, hemoglobin, particles, or analytes, or a combination thereof in the sample stream formed from the sample mixture 3.

In various embodiments, the method may further include using a flow cell in the fluidic cartridge to form a sample stream from the sample mixture 2 in the fluidic cartridge and using the reader instrument to measure cells, RBCs, PLTs, particles, or analytes, or a combination thereof in the sample stream formed from the sample mixture 2. In various embodiments, the method may further include using a flow cell in the fluidic cartridge to form a sample stream from the sample mixture 3 in the fluidic cartridge and using the reader instrument to measure cells, WBCs, hemoglobin, particles, or analytes, or a combination thereof in the sample stream formed from the sample mixture 3.

In various embodiments, this disclosure provides a method of using a fluidic cartridge that may include a serial dilution mechanism or structure for sample analysis (e.g., cytometry analysis). In various embodiments, a method as described herein may include: mixing a sample with a first reagent to form a sample mixture 1; metering a first portion of the sample mixture 1 and mixing the first portion of the sample mixture with a second reagent to form a sample mixture 2; mixing a second portion of the sample mixture 1 with a third reagent to form a sample mixture 3; using a flow cell to form a sample stream from any sample mixture; and measuring a signal from the sample stream to detect cells. In various embodiments, a method as described herein may further include using a metering chamber and a driving mechanism to meter a designated volume of the sample mixture 1 to form the sample mixture 2.

In various embodiments, a method as described herein uses a serial dilution mechanism or structure for preparing sample mixtures. In various embodiments, a serial dilution mechanism or structure as described herein mixes a sample (e.g., a blood sample) with a first reagent to form a once-diluted sample mixture 1. In various embodiments, a serial dilution mechanism or structure as described herein meters a first portion of the sample mixture 1 and mixes it with a second reagent to form an again-diluted sample mixture 2. In some embodiments, a serial dilution mechanism or structure as described herein meters a second portion of the sample mixture 1 and mixes it with a third reagent to form a sample mixture 3. In other embodiments, a serial dilution mechanism or structure as described herein mixes all the remaining volume of the sample mixture 1 (after the first metered portion of which is removed) with a third reagent to form a sample mixture 3.

In some embodiments, the third reagent is a dry or dried reagent. In other embodiments, the third reagent is a liquid reagent. In certain embodiments, the third reagent is a liquid reagent and the second portion of the sample mixture 1 is all the remaining volume of the sample mixture 1 after the first portion of the sample mixture 1 is removed.

In various embodiments, a serial dilution mechanism or structure as described herein uses a metering chamber and a driving mechanism to meter a designated volume of the sample mixture 1 to form the sample mixture 2. In some embodiments, the driving mechanism may include a hydrophilic surface and an additional driving mechanism (e.g., a pneumatic driving mechanism).

In various embodiments, a method as described herein uses a flow cell to measure a signal from a sample mixture to detect cells. In some embodiments, the flow cell measures both the sample mixture 2 and the sample mixture 3. In various embodiments, a method as described herein may further include using the flow cell to form two separate sample streams from the sample mixture 2 and the sample mixture 3 and measuring signals from both sample streams to detect cells. In certain embodiments, the sequence of the measurements is: first the sample mixture 2 and then the sample mixture 3. In some embodiments, a method as described herein may further include introducing at least an air gap between the sample mixtures being measured (e.g., between the sample mixture 2 and the sample mixture 3).

In various embodiments, the first and/or second reagents may include diluents, and the sample mixture 2 is measured to analyze RBCs and/or PLTs. In various embodiments, the third reagent may include an RBC lysing compound, and the sample mixture 3 is measured to analyze WBCs, or hemoglobin, or both.

In various embodiments, a method as described herein uses a fluidic cartridge. In various embodiments, the fluidic cartridge may include a serial dilution mechanism or structure as described herein. In various embodiments, the fluidic cartridge may further include a reagent storage unit.

In various embodiments, a reagent storage unit as described herein stores a designated volume of a reagent. In various embodiments, the reagent storage unit may include a storage chamber configured for accommodating a fluid reagent and a valve with a breakable bonding. In some embodiments, the reagent storage unit may further include a venting port with a breakable seal. In various embodiments, the reagent storage unit is connected to or may further include a pneumatic driving mechanism. In accordance with the present disclosure, the reagent storage unit and/or a part of the reagent storage unit may include a water vapor barrier material. In various embodiments, at least part of the storage chamber may include a water vapor barrier material. In various embodiments, the water vapor barrier material has a water vapor permeability (at 23° C. and 85% relative humidity) of about 0.0001-0.01 g·mm/(m$^2$·day), 0.01-0.1 g·mm/(m$^2$·day), 0.1-1 g·mm/(m$^2$·day), or 1-5 g·mm/(m$^2$·day).

In various embodiments, a fluidic cartridge as described herein may include at least two reagent storage units. In some embodiments, at least one reagent storage unit is for the first reagent and at least another reagent storage unit is for the second reagent. In various embodiments, each of the at least two reagent storage units may include a storage chamber configured for accommodating a fluid reagent and a valve with a breakable bonding. In various embodiments, the valves in the at least two reagent storage units are opened together when the fluidic cartridge is received into a reader instrument.

In various embodiments, a fluidic cartridge as described herein may further include chambers, valves, fluidic conduits, or filters, or their combinations.

In various embodiments, a fluidic cartridge as described herein may further include areas for additional measurements (e.g., hemoglobin and hematocrit measurements). In various embodiments, a fluidic cartridge as described herein may further include an optical window for light transmittance measurement. In some embodiments, the light transmittance measurement is used for analyzing hemoglobin and/or hematocrit.

In various embodiments, a method as described herein uses a reader instrument that receives a fluidic cartridge device and performs measurements and/or analysis of cells. In various embodiments, a method as described herein may further include placing the fluidic cartridge into a reader instrument for measurements and/or analysis of cells.

In various embodiments, the reader may further include driving mechanisms and/or doors to shield ambient light.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for storing the fluid reagent. In such an orientation, an air gap is formed between the venting port and the fluid reagent. Meanwhile, a channel accesses the chamber at a point that is below the top surface of the fluid reagent.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for forming a diluted sample mixture. In such an orientation, an air gap is formed between the venting port and the diluted sample mixture. Meanwhile, a channel accesses the chamber at a point that is below the top surface of the diluted sample mixture. In some embodiments, the diluted sample mixture is transferred out of the chamber via the channel into the flow cell to form a sample stream for cytometer analysis.

In various embodiments, this disclosure provides a serial dilution mechanism or structure. In various embodiments, the serial dilution mechanism or structure is part of a fluidic cartridge. In various embodiments, this disclosure provides a device including a fluidic cartridge that may include a serial dilution mechanism or structure.

In various embodiments, a serial dilution mechanism or structure as described herein may include a first chamber configured for mixing a sample (e.g., a blood sample) with a first reagent to form a sample mixture 1, and a metering chamber connected to the first chamber and configured for metering a designed volume of the sample mixture 1. In various embodiments, the metering chamber has a hydrophilic surface and is connected to a driving mechanism configured for driving the sample mixture 1 to contact the hydrophilic surface. In some embodiments, the driving mechanism is a pneumatic driving mechanism. In various embodiments, the serial dilution mechanism or structure may further include a second chamber connected to the metering chamber and configured for mixing the metered portion of the sample mixture 1 with a second reagent to form a sample mixture 2.

In various embodiments, a serial dilution mechanism or structure as described herein may further include a third chamber connected to the first chamber and configured for mixing a portion of the sample mixture 1 with a third reagent to form a sample mixture 3. In some embodiments, the serial dilution mechanism or structure may further include another metering chamber configured for metering the portion of the sample mixture 1 that is used for forming the sample mixture 3. In some embodiments, the serial dilution mechanism or structure is configured for mixing a metered volume of the sample mixture 1 with a third reagent to form a sample mixture 3. In other embodiments, the serial dilution mechanism or structure is configured for mixing all the remaining volume of the sample mixture 1 (after the first metered portion of which is removed) with a third reagent to form a sample mixture 3.

In certain embodiments, a serial dilution mechanism or structure as described herein may include: a first chamber configured for mixing a sample with a first reagent to form a sample mixture 1; a metering chamber connected to the first chamber and configured for metering a first portion of the sample mixture 1. The metering chamber has a hydrophilic surface and is connected to a driving mechanism configured for driving the sample mixture 1 to contact the hydrophilic surface; and a second chamber connected to the metering chamber and configured for mixing the metered portion of the sample mixture 1 with a second reagent to form a sample mixture 2. In some embodiments, the driving mechanism is a pneumatic driving mechanism. In various embodiments, the serial dilution mechanism or structure may further include a third chamber connected to the first chamber and configured for mixing a second portion of the sample mixture 1 with a third reagent to form a sample mixture 3.

In some embodiments, the third reagent is a dry or dried reagent. In other embodiments, the third reagent is a liquid reagent. In certain embodiments, the third reagent is a liquid reagent and the second portion of the sample mixture 1 is all the remaining volume of the sample mixture 1 after the first portion of the sample mixture 1 is removed.

In various embodiments, the fluidic cartridge may further include a reagent storage unit.

In various embodiments, the reagent storage unit may include a storage chamber configured for accommodating a fluid reagent and a valve with a breakable bonding. In some embodiments, the reagent storage unit may further include a venting port with a breakable seal. In various embodiments, the reagent storage unit is connected to or further receives a pneumatic driving mechanism to release the reagent accommodated therein. In various embodiments, the released reagent is used for serial dilution. In accordance with the present disclosure, the reagent storage unit and/or a part of the reagent storage unit may include a water vapor barrier material. In various embodiments, at least part of the storage chamber may include a water vapor barrier material. In various embodiments, the water vapor barrier material has a water vapor permeability (at 23° C. and 85% relative humidity) of about 0.0001-0.01 g·mm/(m²·day), 0.01-0.1 g·mm/(m²·day), 0.1-1 g·mm/(m²·day), or 1-5 g·mm/(m²·day).

In various embodiments, a fluidic cartridge as described herein may include at least two reagent storage units. In some embodiments, at least one reagent storage unit is for the first reagent and at least another reagent storage unit is for the second reagent. In various embodiments, each of the at least two reagent storage units may include a storage chamber configured for accommodating a fluid reagent and a valve with a breakable bonding. In various embodiments, the valves in the at least two reagent storage units are opened together when the fluidic cartridge is received into a reader instrument.

In various embodiments, a fluidic cartridge as described herein may further include chambers, valves, fluidic conduits, or filters, or their combinations.

In various embodiments, a fluidic cartridge as described herein may further include areas for additional measurements (e.g., hemoglobin and hematocrit measurements). In various embodiments, a fluidic cartridge as described herein may further include an optical window for light transmittance measurement. In some embodiments, the light transmittance measurement is used for analyzing hemoglobin and/or hematocrit.

In various embodiments, a device as described herein may further include a reader instrument that is configured to receive the fluidic cartridge and perform measurements and/or analysis of cells.

In various embodiments, the reader may further include driving mechanisms and/or doors to shield ambient light.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for storing the fluid reagent. In such an orientation, an air gap is formed between the venting port and the fluid reagent. Meanwhile, a channel accesses the chamber at a point that is below the top surface of the fluid reagent.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for forming a diluted sample mixture. In such an orientation, an air gap is formed between the venting port and the diluted sample mixture. Meanwhile, a channel accesses the chamber at a point that is below the top surface of the diluted sample mixture. In some embodiments, the diluted sample mixture is transferred out of the chamber via the channel into the flow cell to form a sample stream for cytometer analysis.

In various embodiments, this disclosure provides a serial dilution mechanism or structure. In various embodiments, the serial dilution mechanism or structure is part of a fluidic cartridge for sample analysis (e.g., cytometry analysis). In various embodiments, this disclosure provides a device including a fluidic cartridge that may include a serial dilution mechanism or structure for sample analysis (e.g., cytometry analysis).

In various embodiments, a serial dilution mechanism or structure as described herein may include a first chamber configured for mixing a sample (e.g., a blood sample) with a first reagent to form a sample mixture 1, and a metering chamber connected to the first chamber and configured for metering a designed volume of the sample mixture 1. In various embodiments, the metering chamber has a hydrophilic surface and is connected to a driving mechanism configured for driving the sample mixture 1 to contact the hydrophilic surface. In some embodiments, the driving mechanism is a pneumatic driving mechanism. In various embodiments, the serial dilution mechanism or structure may further include a second chamber connected to the metering chamber and configured for mixing the metered portion of the sample mixture 1 with a second reagent to form a sample mixture 2. In various embodiments, the serial dilution mechanism or structure may further include a third chamber connected to the first chamber and configured for mixing a portion of the sample mixture 1 with a third reagent to form a sample mixture 3.

In some embodiments, the serial dilution mechanism or structure may further include another metering chamber configured for metering the portion of the sample mixture 1 that is used for forming the sample mixture 3. In some embodiments, the serial dilution mechanism or structure is configured for mixing a metered volume of the sample mixture 1 with a third reagent to form a sample mixture 3. In other embodiments, the serial dilution mechanism or structure is configured for mixing all the remaining volume of the sample mixture 1 (after the first metered portion of which is removed) with a third reagent to form a sample mixture 3.

In various embodiments, the fluidic cartridge may further include a flow cell connected to the first chamber and configured for forming a sample stream of a sample mixture.

In various embodiments, this disclosure provides a device including a fluidic cartridge that may include a serial dilution mechanism or structure and a flow cell for cytometry analysis. In various embodiments, the serial dilution mechanism or structure may include: a first chamber configured for mixing a sample with a first reagent to form a sample mixture 1; a metering chamber connected to the first chamber and configured for metering a first portion of the sample mixture 1; and a second chamber connected to the metering chamber and configured for mixing the metered portion of the sample mixture 1 with a second reagent to form a sample mixture 2. In various embodiments, the flow cell is connected to the first chamber and configured for forming a sample stream from any sample mixture, and for measuring a signal from the sample stream to detect cells. In various embodiments, the metering chamber has a hydrophilic surface and is connected to a driving mechanism configured for driving the sample mixture 1 to contact the hydrophilic surface. In some embodiments, the driving mechanism is a pneumatic driving mechanism. In various embodiments, the serial dilution mechanism or structure may further include a third chamber connected to the first chamber and configured for mixing a second portion of the sample mixture 1 with a third reagent to form a sample mixture 3.

In various embodiments, the sample stream is measured for a signal to detect cells. In various embodiments, the flow cell is configured for forming two separate sample streams from the sample mixture 2 and the sample mixture 3, and both sample streams are measured for signals to detect cells. In certain embodiments, the sequence of the measurements is: first the sample mixture 2 and then the sample mixture 3. In some embodiments, a device as described herein is configured for introducing at least an air gap between the sample mixtures being measured (e.g., between the sample mixture 2 and the sample mixture 3).

In some embodiments, the third reagent is a dry or dried reagent. In other embodiments, the third reagent is a liquid reagent. In certain embodiments, the third reagent is a liquid reagent and the second portion of the sample mixture 1 is all the remaining volume of the sample mixture 1 after the first portion of the sample mixture 1 is removed.

In certain embodiments, the flow cell is a sheathless flow cell. The sample stream flows through the flow cell without a sheath flow and has a diameter equal or close to the diameter of the flow cell. In some embodiments, the sheathless flow cell has a width in the range of about 1-10 µm, 10-40 µm, 40-100 µm, or 100-200 µm, and a depth in the range of about 1-10 µm, 10-40 µm, 40-100 µm, or 100-200 µm. In some embodiments, the flow cell is configured for using a sheath flow to narrow down the diameter of the sample stream to be smaller than the diameter of the flow cell itself.

In various embodiments, the flow cell may include an optically transparent window configured for measuring an optical signal from the sample stream. Examples of the optical signal include but are not limited to fluorescence light, light scattering, light absorption, and light extinction, and their combinations, et cetera.

In various embodiments, the first and/or the second reagents may include diluents, and the sample mixture 2 is measured to analyze RBCs and/or PLTs. In various embodiments, the third reagent may include an RBC lysing compound, and the sample mixture 3 is measured to analyze WBCs, or hemoglobin, or both.

In various embodiments, the fluidic cartridge may further include a reagent storage unit.

In various embodiments, the reagent storage unit may include a storage chamber configured for accommodating a fluid reagent and a valve with a breakable bonding. In some embodiments, the reagent storage unit may further include a venting port with a breakable seal. In various embodiments, the reagent storage unit is connected to or further receives a pneumatic driving mechanism to release the reagent accommodated therein. In various embodiments, the released reagent is used for serial dilution. In accordance with the present disclosure, the reagent storage unit and/or a part of the reagent storage unit may include a water vapor barrier material. In various embodiments, at least part of the storage chamber may include a water vapor barrier material. In various embodiments, the water vapor barrier material has a water vapor permeability (at 23° C. and 85% relative humidity) of about 0.0001-0.01 g·mm/(m²·day), 0.01-0.1 g·mm/(m²·day), 0.1-1 g·mm/(m²·day), or 1-5 g·mm/(m²·day).

In various embodiments, a fluidic cartridge as described herein may include at least two reagent storage units. In some embodiments, at least one reagent storage unit is for the first reagent and at least another reagent storage unit is for the second reagent. In various embodiments, each of the at least two reagent storage units may include a storage chamber configured for accommodating a fluid reagent and a valve with a breakable bonding. In various embodiments, the valves in the at least two reagent storage units are opened together when the fluidic cartridge is received into a reader instrument.

In various embodiments, a fluidic cartridge as described herein may further include chambers, valves, fluidic conduits, or filters, or their combinations.

In various embodiments, a fluidic cartridge as described herein may further include areas for additional measurements (e.g., hemoglobin and hematocrit measurements). In various embodiments, a fluidic cartridge as described herein may further include an optical window for light transmittance measurement. In some embodiments, the light transmittance measurement is used for analyzing hemoglobin and/or hematocrit.

In various embodiments, a device as described herein may further include a reader instrument that is configured to receive the fluidic cartridge and perform measurements and/or analysis of cells.

In various embodiments, the reader instrument may further include driving mechanisms and/or doors to shield ambient light.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for storing the fluid reagent. In such an orientation, an air gap is formed between the venting port and the fluid reagent. Meanwhile, a channel accesses the chamber at a point that is below the top surface of the fluid reagent.

In various embodiments, the fluidic cartridge received in the reader instrument is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for forming a diluted sample mixture. In such an orientation, an air gap is formed between the venting port and the diluted sample mixture. Meanwhile, a channel accesses the chamber at a point that is below the top surface of the diluted sample mixture. In some embodiments, the diluted sample mixture is transferred out of the chamber via the channel into the flow cell to form a sample stream for cytometer analysis.

In various embodiments, this disclosure provides a method of using a reagent storage unit in a fluidic cartridge. The reagent storage unit may include a storage chamber configured for accommodating a fluid reagent and a valve with a breakable bonding. The method may include storing the fluid reagent in the reagent storage unit; and applying a pneumatic pressure to the reagent storage unit to transfer the fluid reagent out of the storage chamber. In various embodiments, a method as described herein may further include applying an actuation mechanism to the fluidic cartridge to open the breakable bonding of the valve. In various embodiments, the fluid reagent is transferred out of the storage chamber via the opened valve.

In accordance with the present disclosure, the reagent storage unit and/or a part of the reagent storage unit may include a water vapor barrier material. In various embodiments, at least part of the storage chamber may include a water vapor barrier material. In various embodiments, the water vapor barrier material has a water vapor permeability (at 23° C. and 85% relative humidity) of about 0.0001-0.01 g·mm/(m²·day), 0.01-0.1 g·mm/(m²·day), 0.1-1 g·mm/(m²·day), or 1-5 g·mm/(m²·day).

In various embodiments, the reagent storage unit may further include a venting port with a breakable seal. In various embodiments, the pneumatic pressure is applied to the venting port and the breakable seal is opened to receive the pneumatic pressure into the chamber.

In various embodiments, a method as described herein may further include receiving a sample (e.g., a blood sample) into the fluidic cartridge to form a sample mixture with the fluid reagent.

In various embodiments, a method as described herein may further include using a reader instrument to receive the fluidic cartridge thereinto for performing measurements and/or analysis of cells.

In various embodiments, the received fluidic cartridge is positioned in such an orientation that gravity pulls a fluid reagent inside a chamber away from the chamber's venting port and towards the chamber's bottom. In various embodiments, the chamber is one or more of the first chamber, the second chamber, the third chamber, and the storage chamber. In some embodiments, the chamber is configured for forming a diluted sample mixture. In such an orientation, an air gap is formed between the venting port and the diluted sample mixture. Meanwhile, a channel accesses the chamber at a point that is below the top surface of the diluted sample mixture. In some embodiments, the diluted sample mixture is transferred out of the chamber via the channel into the flow cell to form a sample stream for cytometer analysis.

In various embodiments, a fluidic cartridge as described herein may include at least two reagent storage units. In some embodiments, at least one reagent storage unit is for the first reagent and at least another reagent storage unit is for the second reagent. In various embodiments, each of the at least two reagent storage units may include a storage chamber configured for accommodating a fluid reagent and a valve with a breakable bonding. In various embodiments, the valves in the at least two reagent storage units are opened together when the fluidic cartridge is received into a reader instrument.

FIG. 1A shows a non-limiting example of a dilution sequence in a serial dilution method described herein. First, a sample is mixed with a first reagent (e.g., a liquid reagent or diluent) to form a once-diluted sample mixture 1. The sample can be gas samples such as breaths, liquid samples such as body fluids (e.g., blood, lymph, sweat, tear, sperm, saliva, and urine, et cetera), and solid samples such as nucleic acid extractions or tumor biopsies, et cetera. A first portion of the sample mixture 1 is metered and then mixed with a second reagent to form a sample mixture 2. In some embodiments, the second reagent is a liquid reagent and the sample mixture 2 is twice diluted from the sample. In other embodiments, the second reagent is a dry or dried reagent. Additionally, a second portion of the sample mixture 1 can be mixed with a third reagent to form a sample mixture 3. In some embodiments, the third reagent is a liquid reagent. In other embodiments, the third reagent is a dry or dried reagent. The sample mixture 2 and 3 can be used for the same or different sample analysis. Various types of analysis technologies, including but not limited to cytometry, spectrometry (e.g., mass spectrometry, optical spectrometry, and ion-mobility spectrometry, et cetera), and chemiluminescence, can be used to perform sample analysis.

Figure 1B:
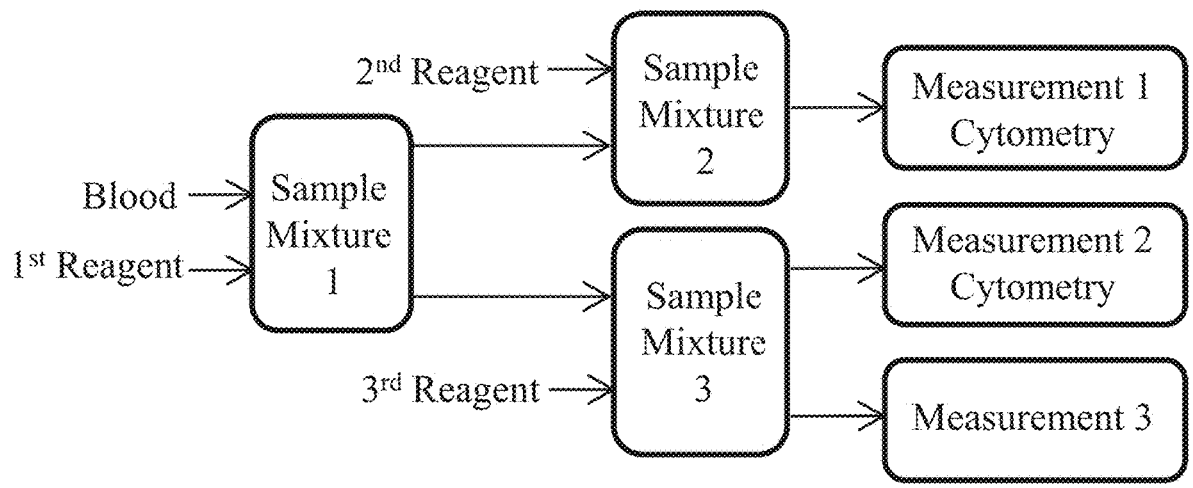
FIG. 1B is a block diagram illustrating the dilution sequence in a serial dilution for cytometry analysis and additional measurements according to other embodiments of the disclosure.

FIG. 1B shows a non-limiting example of a dilution sequence in a serial dilution method as described herein. First, a blood sample is mixed with a first reagent, which is a liquid diluent, and forms a once-diluted sample mixture 1. Second, a first portion of the sample mixture 1 is transferred to be mixed with a second reagent, which is also a liquid diluent, and forms an again-diluted sample mixture 2. Meanwhile, a second portion of the sample mixture 1 is transferred to be mixed with a third reagent to form a sample mixture 3.

In various embodiments, the dilution ratios of the sample mixtures have to be accurately controlled in the dilution sequence. This is particularly important for cytometer analysis that measures cell concentrations.

In some embodiments, the dilution ratio of the sample mixture 1 is controlled by taking a designated volume of the blood sample to mix with a designated volume of the first reagent. In some embodiments, the dilution ratio of the sample mixture 2 is controlled by metering the first portion of the sample mixture 1 and mixing it with a designated volume of the second reagent. In some embodiments, the dilution ratio of the sample mixture 3 is controlled by metering the second portion of the sample mixture 1 and mixing it with a designated volume of the third reagent.

In certain embodiments, the third reagent is a dry or dried reagent, which mixes with a second portion of the sample mixture 1 to from the sample mixture 3. In this way, the dilution ratio of sample mixture 3 remains the same as or very close to the dilution ratio of the sample mixture 1, and no step of metering the second portion of the sample mixture 1 is needed.

In certain embodiments, the total volume of the sample mixture 1 is controlled by controlling the designated volume of the blood sample and the designated volume of the first reagent. By taking out a metered volume of the sample mixture 1 as the first portion to from the sample mixture 2, all of the remaining of the sample mixture 1 is used as the second portion and mixed with a designated volume of the third reagent to form the sample mixture 3. In this way, the dilution ratio of the sample mixture 3 is controlled accurately without a step of metering the second portion of the sample mixture 1.

This dilution sequence can be used for sample analysis (e.g., cytometry analysis, a CBC test, and other measurements). As a non-limiting example, a portion or all of the sample mixture 2 can be used for a first cytometry analysis (e.g., the detection of RBCs and PLTs in a CBC test). As a non-limiting example, a portion or all of the sample mixture 3 can be used for a second cytometry analysis (e.g., the detection of WBCs in a CBC test). As a non-limiting example, a portion or all of the sample mixture 3 can be used for a third measurement (e.g., the detection of hemoglobin concentration in a CBC test).

In a CBC test, a high dilution ratio (e.g., 500-2,000 times) is often used for the measurements of RBCs and PLTs, whereas a low or medium dilution ratio (e.g., 20-100 times) is used for the measurements of WBCs and hemoglobin. In FIG. 1B, the blood sample is serially diluted with the first and then the second liquid diluents to achieve the high dilution ratio in the sample mixture 2 for the measurements of RBCs and PLTs; and when the third reagent is a dry or dried reagent, the sample mixture 3 is once-diluted with a liquid diluent to achieve the low or medium dilution ratio for the measurements of WBCs and hemoglobin. As a non-limiting example, 10 µL of the blood sample is diluted with 490 µL of the first reagent to form the sample mixture 1 (total dilution ratio 50 times). 10 µL of the sample mixture 1 is metered and transferred to be diluted with 390 µL of the second reagent to form the sample mixture 2 (total dilution ratio 2,000 times). Meanwhile, a portion of the sample mixture 1 is transferred to be mixed with the third reagent, e.g. a dry or dried reagent, to form the sample mixture 3 (total dilution ratio 50 times).

The total volume of the liquid reagents used in this serial dilution (e.g., 490 µL of the first reagent and 390 µL of the second reagent) is significantly less than the volume needed in a one-step dilution (e.g., 19,990 µL diluent for 2,000 times dilution of the 10 µL blood sample). It helps to reduce the size of fluidic cartridge devices that implement the dilution method. Furthermore, by sharing the first step of dilution and using a dry or dried reagent to form the sample mixture 3, it reduces the complexity of fluidic cartridge devices that implement CBC measurements.

The serial dilution sequence can be further used for measuring the sample mixtures for additional CBC parameters. For example, the sizes of RBCs or PLTs could be measured in the first cytometry analysis to determine the hematocrit or plateletcrit. For example, a light transmittance measurement can be performed on the sample mixture 1, the sample mixture 2, or both to determine the hematocrit. In addition to CBC parameters, the serial dilution sequence can be used in other cytometry measurements (e.g., CB4+/CD8+ T-cell detection, et cetera).

Figure 2:
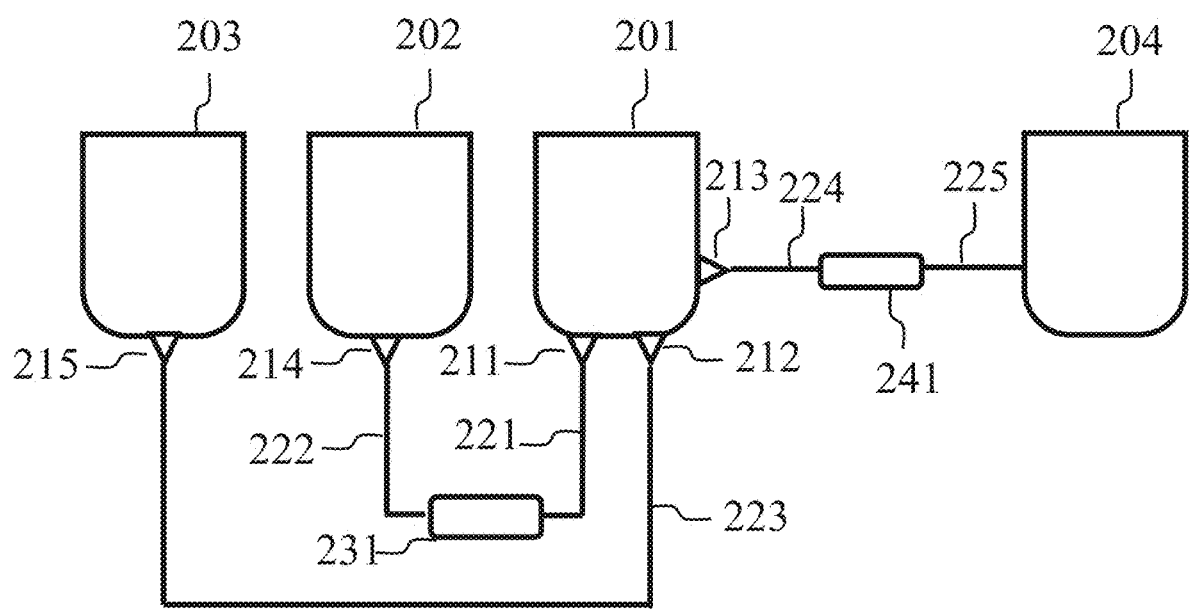
FIG. 2 illustrates a fluidic diagram for implementing a serial dilution for various sample analysis methods according to various embodiments of the disclosure.

FIG. 2 shows a non-limiting example of a fluidic diagram to implement a serial dilution method as described herein. A blood sample and a first reagent are introduced into a chamber 201 to form the sample mixture 1, and valves 211, 212, and 213 are closed to prevent the sample mixture 1 from exiting the chamber. The chamber can have an inlet port for introducing the sample and first reagent.

To collect the first portion of the sample mixture 1, the valve 211 is opened and a portion of the sample mixture 1 is transferred via a fluid conduit 221 into a metering chamber 231, which collects a designated volume of the sample mixture 1. The transfer of the sample mixture 1 into the metering chamber 231 is driven by an actuation mechanism. For example, the fluid conduit 221 and the metering chamber 231 can have hydrophilic surfaces that introduce a capillary force to pull the sample mixture.

To form the sample mixture 3, the valve 212 is opened and a portion of the sample mixture 1 is transferred via a fluid conduit 223 into a chamber 203, and a valve 215 is closed to prevent the sample mixture from exiting the chamber after the transfer is completed. A third reagent is initially stored in the chamber 203 and mixed with the sample mixture 1 to form the sample mixture 3. In certain embodiments, the third reagent is a dry or dried reagent. In some embodiments, the third reagent is a liquid reagent, and all of the sample mixture 1 remaining in the chamber 201, after the first portion is transferred into the metering chamber 231, is transferred as the second portion.

To form the sample mixture 2, the valve 214 is opened to mix a second reagent, which is initially in the chamber 202, with the first portion of the sample mixture 1 that is collected in the metering chamber 231 via a fluid conduit 222. As a non-limiting example, a pneumatic pressure is applied to the chamber 202 as an actuation mechanism, which drives the second reagent to flush the sample mixture 1 in the metering chamber 231 into the chamber 201, so as to form the sample mixture 2. In some embodiments, any residue of the sample mixture 1 or sample mixture 3 that remains in the chamber 201 is drained away (e.g., into a collection chamber 204) before forming the sample mixture 2 in the chamber 201.

In various embodiments, an RBC lysing compound is introduced into the chamber 201 before the first portion of the sample mixture 1 and the second reagent are introduced into the chamber 201 to form sample mixture 2. This step is important to minimize the impact from the residue of the sample mixture 1 remaining in the chamber 201 when the sample mixture 2 is analyzed. For example, the once-diluted sample mixture 1 contains a much higher concentration of cells (e.g., 0.4 million RBCs in a microliter), while the again-diluted sample mixture 2 contains a much lower concentration of cells (e.g., 0.01 million RBCs in a microliter). Therefore, even a small volume (e.g., 1 microliter) of the sample mixture 1 remaining in the chamber 201 can have a significant impact on the analysis of the sample mixture 2. Therefore, it benefits the analysis of the sample mixture 2 to introduce an RBC lysing compound into the first chamber 201 to lyse RBCs in the residue of the sample mixture 1, before the sample mixture 2 is formed in the first chamber 201.

For the first cytometry analysis, a valve 213 is opened to allow at least a portion of the sample mixture 2 to be transferred via a fluid conduit 224 into a flow cell 241, where the sample mixture 2 forms a sample stream for measurements (e.g., the detection of RBCs and PLTs in a CBC test). Any sample mixture exiting the flow cell 241 further flows via a fluid conduit 225 into the collection chamber 204. In certain embodiments, any residue of the sample mixture 2 in the chamber 201 is transferred out after the first cytometer analysis (e.g., into the collection chamber 204). For the second cytometer analysis, the sample mixture 3 in the chamber 203 is first transferred into the chamber 201, and then at least a portion of the sample mixture 3 is transferred into the flow cell 241 for measurements (e.g., the detection of WBCs in a CBC test). Meanwhile, additional measurements could be made on the sample mixtures. As a non-limiting example, a third measurement (e.g., the detection of the hemoglobin in a CBC test) is performed on the sample mixture 3 in the chamber 201 (e.g., using a method of light transmittance detection). As a non-limiting example, another measurement (e.g., the detection of the hematocrit in a CBC test) is performed on the sample mixture 1 in the chamber 201 (e.g., using a method of light transmittance detection).

Figure 3:
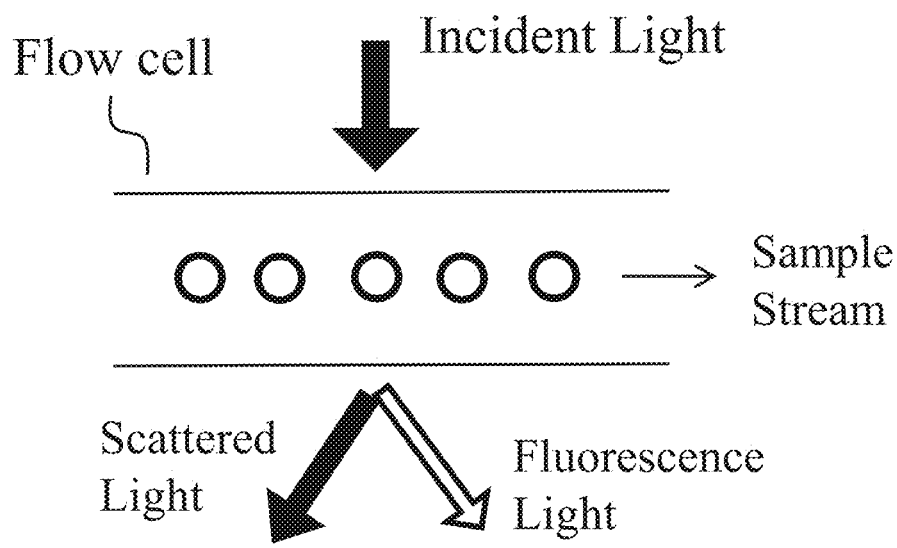
FIG. 3 illustrates an example of a flow cell for cytometry analysis according to some embodiments of the disclosure.

Various designs of the flow cell 241 can be used for cytometer analysis. In flow cytometers, a flow cell design usually uses a sheath flow to narrow down the diameter of a sample stream to be smaller than the diameter of the flow cell itself. In certain embodiments of this disclosure, a sheathless flow cell design is used, as shown in FIG. 3. In this design, the sample stream flows through the flow cell without a sheath flow and has a diameter equal or close to the diameter of the flow cell. This sheathless design reduces the complexity of the fluidic diagram to implement cytometer analysis in a serial dilution sequence. Various types of signals can be measured in the flow cell for cytometry analysis. As a non-limiting example, an incident light illuminates the sample stream in the flow cell, and optical signals (which include but are not limited to fluorescence light, light scattering, light absorption, and light extinction, and their combinations) are measured from the sample stream simultaneously. Various flow cell designs and detection signal types are described in U.S. patent Ser. No. 15/803,133 and International Application No. PCT/US17/59965, which are incorporated herein by reference in their entirety as if fully set forth.

In some embodiments of the fluidic diagram in FIG. 2, a third measurement (e.g., the detection of hemoglobin in a CBC test) is performed on the sample mixture 3 in the chamber 201. Various measurement signals and device designs can be used for this measurement. As a non-limiting example shown in FIG. 4, a light path is formed between two transparent surfaces and light transmittance along the light path is measured. In this example, two transparent surfaces, surface 1 and surface 2, are on the chamber 201. An incident light enters the chamber 201 through the surface 1, travels through the sample mixture in the chamber 201, and exits the chamber 201 through the surface 2. The transmitted light behind the surface 2 is measured. The light transmittance, which is the intensity ratio of the incident light and the transmitted light, is analyzed to determine the hemoglobin concentration. Various device designs and methods of the light transmittance measurement are described in the International Application No. PCT/US17/62765 and U.S. patent Ser. No. 15/819,416, which are incorporated herein by reference in their entirety as if fully set forth.

Various reagents or their combinations can be used in the serial dilution to obtain the CBC measurements. As a non-limiting example, the first reagent used in the fluidic diagram of FIG. 2 may include a dilution buffer, which dilutes the blood sample while minimizing or avoiding hemolysis of RBCs. Examples of the first reagent include but are not limited to a water solution of sodium chloride or potassium chloride, or phosphate-buffered saline, or their equivalents. The osmolarity of the first reagent is adjusted to minimize undesired hemolysis, for example, in the range of about 140-160, 160-180, 180-200, 200-220, 220-240, 240-260, 260-280, 280-300, 300-320, 320-340, 340-360, 360-380, or 380-400 mOsm/L. After mixing with the blood sample, it forms the sample mixture 1 with an osmolarity of about 140-160, 160-180, 180-200, 200-220, 220-240, 240-260, 260-280, 280-300, 300-320, 320-340, 340-360, 360-380, or 380-400 mOsm/L.

In some embodiments, the first reagent may further include a fluorescent dye, such as a nucleic acid dye that has high affinity binding to DNA, or RNA, or both of DNA and RNA. The fluorescent dye labels WBCs and PLTs and distinguish them from other particles of similar sizes in the sample mixture. The fluorescence signal can also be used to identify different WBC subtypes, such as lymphocytes, monocytes, neutrophils, eosinophils, or basophils, et cetera. Examples of the fluorescent dye include but are not limited to Propidium Iodide, Ethidium Bromide, DAPI, Hoechst dyes, Acridine Orange, Thiazole Orange, 7-AAD, LDS751, Basic Orange 21, Capri blue, Nile Blue, Brilliant Cresyl Blue, et cetera.

As a non-limiting example, the second reagent in the fluidic diagram of FIG. 2 may include a dilution buffer, which further dilutes the sample mixture 1 while minimizing or avoiding hemolysis of RBCs. Examples of the second reagent include but are not limited to a water solution of sodium chloride or potassium chloride, or phosphate-buffered saline, or their equivalents. The osmolarity of the second reagent is adjusted to minimize undesired hemolysis, for example, in the range of about 140-160, 160-180, 180-200, 200-220, 220-240, 240-260, 260-280, 280-300, 300-320, 320-340, 340-360, 360-380, or 380-400 mOsm/L. After mixing with the sample mixture 1, it forms the sample mixture 2 with an osmolarity of about 140-160, 160-180, 180-200, 200-220, 220-240, 240-260, 260-280, 280-300, 300-320, 320-340, 340-360, 360-380, or 380-400 mOsm/L.

In certain embodiments, the second reagent has an osmolarity of about 140-160, 160-180, 180-200, 200-220, 220-240, 240-260, 260-280, 280-300 mOsm/L, and it forms the sample mixture 2 with a final osmolarity of 140-160, 160-180, 180-200, 200-220, 220-240, 240-260, 260-280, 280-300 mOsm/L. These osmolarity levels introduce hypotonicity of RBCs and help to increase the transformation of RBCs from a biconcave shape into a spherical shape. In this way, the sizes of RBCs could be measured with less variation from different orientations of cells.

In some embodiments, the second reagent may further include a surfactant or a salt, which helps to significantly transform RBCs from a biconcave shape into a spherical shape. Examples of the surfactant or salt include but are not limited to sodium dodecyl sulfate, sodium lauryl sulfate, octyl trimethyl ammonium chloride, decyl trimethyl ammonium chloride, dodecyl trimethyl ammonium chloride, trimethyl-tetradecylammonium chloride, cetyltrimethylammonium chloride et cetera.

In some embodiments, the second reagent may further include a fluorescent dye, such as a nucleic acid dye that has high affinity binding to DNA, or RNA, or both of DNA and RNA. The fluorescent dye labels PLTs and distinguishes them from other particles of similar sizes in the sample mixture 2 (e.g., lipid particles) and improves the accuracy of detecting PLTs. Examples of the fluorescent dye include but are not limited to Thiazole Orange, Capri blue, Nile Blue, Brilliant Cresyl Blue, Acridine Orange, Basic Orange 21, et cetera.

In various embodiments, the fluorescent dye in the first reagent is introduced into both the sample mixture 2 and the sample mixture 3. In various embodiments, the fluorescent dye in the second reagent is introduced into the sample mixture 2 only. In some embodiments, the fluorescent dye in the first reagent and the second reagent can be the same dye. In other embodiments, the fluorescent dye in the first reagent and the second reagent can be different dyes, to optimize the fluorescent labeling in the sample mixture 2 and sample mixture 3, respectively.

As a non-limiting example, the third reagent in the fluidic diagram of FIG. 2 may include a lysing compound that lyses RBCs in the sample mixture 3 to release hemoglobin. Examples of the lysing compound include but are not limited to ammonium salts, quaternary ammonium salts, pyridinium salts, hydroxylamine salts, nonionic surfactants, ionic surfactants, dodecyl sodium sulfate, lauryl sodium sulfate, et cetera.

In some embodiments, the third reagent may further include a compound that helps to dissolve the membrane of RBCs or debris of the lysed RBCs. Examples of the compound include but not limited to surfactants such as BC30TX, polyoxyethylene cetyl ether, saponin, Tween-20, Triton X-100, et cetera. In certain embodiments, this compound is a non-ionic surfactant such as BC30TX and saponin, et cetera.

In some embodiments, the third reagent may further include a fluorescent dye, such as a nucleic acid dye that has high affinity binding to DNA, or RNA, or both of DNA and RNA. The fluorescent dye labels WBCs to distinguish them from other particles of similar sizes in the sample mixture and introduce the fluorescence signal to identify different WBC subtypes, such as lymphocytes, monocytes, neutrophils, eosinophils, or basophils, et cetera. Examples of the fluorescent dye include but are not limited to Propidium Iodide, Ethidium Bromide, DAPI, Hoechst dyes, Acridine Orange, Thiazole Orange, 7-AAD, LDS751, Basic Orange 21, et cetera.

In certain embodiments, the third reagent is stored as a dry or dried reagent before mixing with the sample mixture 1 to form the sample mixture 3. In this way, the dilution ratio of the sample mixture 3 remains the same or very close to the sample mixture 1. Therefore, no additional metering steps is needed to accurately control the dilution ratio of sample mixture 3. In this way, it helps to simplify the fluidic diagram and device design (e.g., in a disposable fluidic cartridge) to implement the CBC measurements.

In some embodiments, the third reagent is stored as a thin layer of dried coating comprising the reagent compounds, which quickly dissolve upon contacting the sample mixture 1. The thickness of the dried coating layer is of about 1,000 to 100 μm, 100 to 10 μm, 10 to 1 μm, 1 to 0.1 μm, 0.1 to 0.01 μm, or 0.01 to 0.001 μm. Various methods can be used to form the dried coating layer. As a non-limiting example, the reagent compound or compounds are first dissolved in a solvent to form a liquid solution; then the liquid solution is applied to a solid substrate (e.g., a plastic surface) on the chamber; and finally the solvent in the liquid solution is quickly dried to coat the reagent compound or compounds on the substrate.

More examples of the reagent compounds or their combinations are disclosed in International Application No. PCT/US17/62765 and U.S. patent application Ser. No. 15/819,416, which are incorporated herein by reference in their entirety as if fully set forth.

Figure 5A:
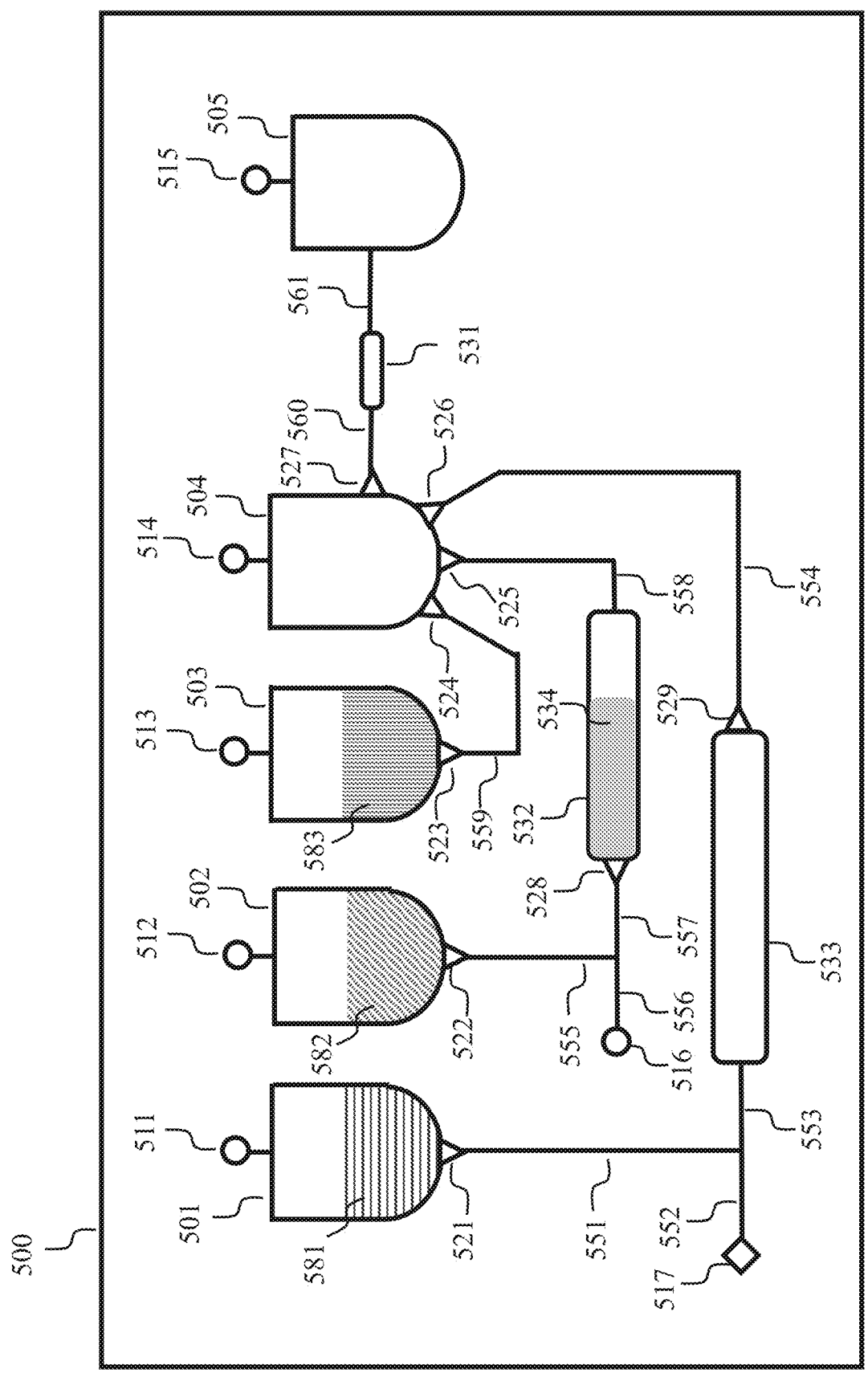
FIGS. 5A-5C illustrate examples of fluidic cartridge devices for sample analysis (e.g., cytometer analysis) with serial dilution according to some embodiments of the disclosure.

FIG. 5A shows a non-limiting example of a fluidic cartridge for implementing a serial dilution in a CBC test. In this fluidic cartridge 500, the first reagent 581 is initially received in a chamber 501, and a valve 521 is closed to prevent the reagent from exiting the chamber. An inlet port 517 receives a blood sample into the cartridge, and a fluidic conduit 552 further leads the blood sample into a fluidic conduit 553 and a metering chamber 533. In certain embodiments, the surfaces of the fluidic conduits 552 and 553 and the surface of the metering chamber 533 are hydrophilic, which provide a capillary force to pull the blood sample to flow. When the blood sample reaches a capillary valve 529, it stops flowing and a designated volume of the sample is collected in the metering chamber 533.

To mix the first reagent with the blood sample, the valve 521 is opened and a driving mechanism is applied to the reagent 581 in the chamber 501. The driving mechanism drives the first reagent into a fluidic conduit 551, which connects to the fluidic conduit 553 and the metering chamber 533. The first reagent 581 flushes the blood sample inside the fluidic conduit 553 and the metering chamber 533 to pass the capillary valve 529, into a fluidic conduit 554, and further into a chamber 504 to form the sample mixture 1. Valves 524, 525, 526 and 527 are then closed to prevent the sample mixture 1 from exiting the chamber 504. Various driving mechanisms can be used to drive the reagent 581. As a non-limiting example, a pneumatic pressure higher than the ambient atmospheric pressure is applied to a venting port 511 of the chamber 501, while the ambient atmospheric pressure is connected to a venting port 514 of the chamber 504. This pneumatic configuration applies a pneumatic force to drive the reagent 581 from the chamber 501 to the chamber 504.

To collect a portion of the sample mixture 1 as the first portion to be mixed with the second reagent, the valve 525 is opened and a driving mechanism is applied to the sample mixture 1 to drive it into a fluidic conduit 558 and further into a metering chamber 532. A capillary valve 528 stops the sample mixture flow and collects a designated volume of the sample mixture in the metering chamber 532. Various driving mechanisms can be used for this sample mixture transfer. As a non-limiting example, a venting port 516 is configured to be connected to the metering chamber 532 via fluidic conduits 556 and 557. A pneumatic pressure lower than the ambient atmospheric pressure is applied to the venting port 516, while the ambient atmospheric pressure is connected to the venting port 514 of the chamber 504. This configuration applies a pneumatic force to pull the sample mixture 1 from the chamber 504 into the fluidic conduit 558 and further into the metering chamber 532. In certain embodiments, at least a portion of the surface of the metering chamber 532 (e.g., a surface area 534 that is colored in grey in the drawing) is hydrophilic. Once the sample mixture 1 flows to contact the surface area 534, the initial driving mechanism is removed. The hydrophilic surface of the area 534 introduces a capillary force that continues to pull the sample mixture 1 to flow into the metering chamber. This flow is stopped when it reaches the capillary valve 528.

To form the sample mixture 3, the valve 524 is opened and a driving mechanism is applied to the sample mixture 1 remained in the chamber 504. The driving mechanism drives the second portion of the sample mixture 1 into a fluidic conduit 559 and further into a chamber 503. Various driving mechanisms can be used for this sample mixture transfer. As a non-limiting example, a pneumatic pressure lower than the ambient atmospheric pressure is applied to the venting port 513 of the chamber 503, while the ambient atmospheric pressure is connected to the venting port 514 of the chamber 504. After the second portion of the sample mixture 1 is driven into the chamber 503, the valve 523 can be closed. The third reagent is initially received in the chamber 503. In certain embodiments, the third reagent 583 is stored in the chamber 503 as a dry or dried reagent, or dried coating. The portion of the sample mixture 1 transferred into the chamber 503 dissolves at least a portion of dry or dried reagent, or dried coating, and forms the sample mixture 3. In some embodiments, the third reagent 583 is stored as liquid reagent in the chamber 503, and all of the sample mixture 1 remained in the chamber 504, after the first portion is transferred into the metering chamber 532, is transferred as the second portion.

In some embodiments, before proceeding to form the sample mixture 2, any sample mixtures remaining in the chamber 504 is driven out of the chamber (e.g., into a collection chamber 505). In certain embodiments, the second reagent 582 is initially received in the chamber 502 and stored in a liquid form. To form the sample mixture 2, the valve 522 is opened and the venting port 516 is closed (e.g., by an external seal). A driving mechanism is applied to the second reagent 582, which flows into the fluid conduit 555 and further flushes the sample mixture 1 in the metering chamber 532 into the chamber 504 and forms the sample mixture 2. As a non-limiting example of the driving mechanism, a pneumatic pressure higher than the ambient atmospheric pressure is applied to the venting port 512 while the venting port 514 is connected to the ambient atmospheric pressure.

For the first cytometry analysis, a valve 527 is opened and a driving mechanism is applied to the sample mixture 2 in the chamber 504. At least a portion of the sample mixture 2 is driven into a fluidic conduit 560 and further into a flow cell 531 and forms a sample stream for the first cytometry analysis. In some embodiments, the same stream exiting the flow cell 531 flows through a fluidic conduit 561 and is received into the collection chamber 505. As a non-limiting example of the driving mechanism, a pneumatic pressure lower than the ambient atmospheric pressure is applied to a venting port 515 of the chamber 505, while the venting port 514 is connected to the ambient atmospheric pressure.

In a CBC test, the first cytometry analysis detects either RBCs or PLTs or both in the sample mixture 2. Different types of signals (e.g., optical signals, electrical signals, or a combination of both types) could be measured in the flow cell 531 for detection. In certain embodiments, the detection of RBCs and PLTs uses at least an optical signal and the flow cell 531 may include a transparent window for the optical measurement. Examples of the optical signal include but are not limited to fluorescence light, light scattering, light absorption, and light extinction, and their combinations, et cetera. In some embodiments, the first cytometry analysis determines the number of RBCs or PLTs or both in a sample. In some embodiments, the measurement further determines other characteristics of RBCs or PLTs, which include but are not limited to the sizes of RBCs or PLTs.

For the second cytometry analysis, the sample mixture 3 is first transferred to the chamber 504, and then driven to the flow cell 531 to form a sample stream (e.g., by the same or a similar driving mechanism used in the first cytometry analysis). In certain embodiments, before the sample mixture 3 being transferred into the chamber 504, any sample mixtures remaining in the chamber 504 is transferred out (e.g., into the collection chamber 505). The second cytometry analysis of the sample stream detects WBCs in the sample mixture 3. Different types of signals (e.g., optical signals, electrical signals, or a combination of both types) could be measured in the flow cell 531. In certain embodiments, the detection of WBCs uses at least an optical signal. Examples of the optical signal include but are not limited to fluorescence light, light scattering, light absorption, and light extinction, and their combinations, et cetera. In a CBC test, the second cytometry analysis determines the number of WBCs in a sample. In some embodiments, the analysis further determines the number of WBC subtypes, such as lymphocytes, monocytes, neutrophils, eosinophils, or basophils.

In addition to the first and the second cytometry analysis, additional measurements can be performed on the sample mixtures. In certain embodiments, a third measurement is performed on the sample mixture 3 in the chamber 504 to detect hemoglobin in a sample. Various types of signals and device designs can be used for this measurement, and a non-limiting example of using light transmittance measurement has been shown in FIG. 4. In some embodiments, the third measurement of hemoglobin is performed on the sample mixture 3 before the second cytometry analysis. In other embodiments, the third measurement is performed on a portion of the sample mixture 3 that remained in the chamber 504 after the second cytometry analysis.

Figure 4:
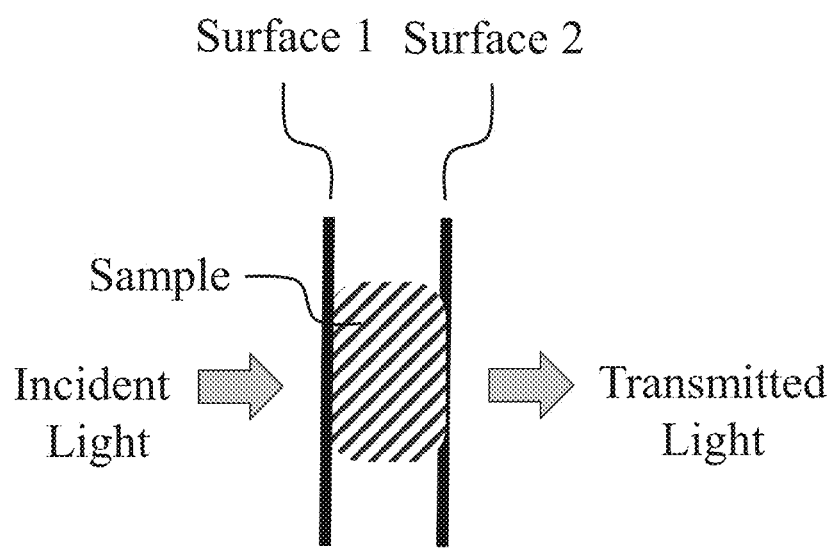
FIG. 4 illustrates an example of a sensing area for a light transmittance measurement according to some embodiments of the disclosure.

In some embodiments, additional measurements are further performed on one or more of the sample mixtures for CBC parameters. In a non-limiting example, a light transmittance measurement as shown in FIG. 4 is performed on either the sample mixture 1 or the sample mixture 2 or both to determine the hematocrit in a sample. Various methods can be used to quantify hematocrit with the light transmittance measurement as described in U.S. Pat. No. 6,064,474, which is incorporated herein by reference in its entirety as if fully set forth.

In the non-limiting example of FIG. 5A, cytometry analysis of the sample mixture 2 and the sample mixture 3 are both performed in the same flow cell 531. The sequence of measuring these two sample mixtures are interchangeable. In certain embodiments, the sample mixture 2 is measured in the flow cell before the sample mixture 3, and this sequence can reduce risk of forming unexpected bubbles in the flow cell. This is because the sample mixture 2 has a higher dilution ratio than sample mixture 3, and thus lower concentration of proteins from the blood sample. Proteins adhering to the flow cell can change the surface property of the flow cell and make it more vulnerable to forming unexpected bubbles. In other embodiments, the sample mixture 3 is measured in the flow cell before the sample mixture 2. In some embodiments, between measuring the sample mixture 2 and the sample mixture 3, at least a segment of air is pumped into the flow cell. The air gap helps provide a separation between the two sample streams.

Figure 6A:
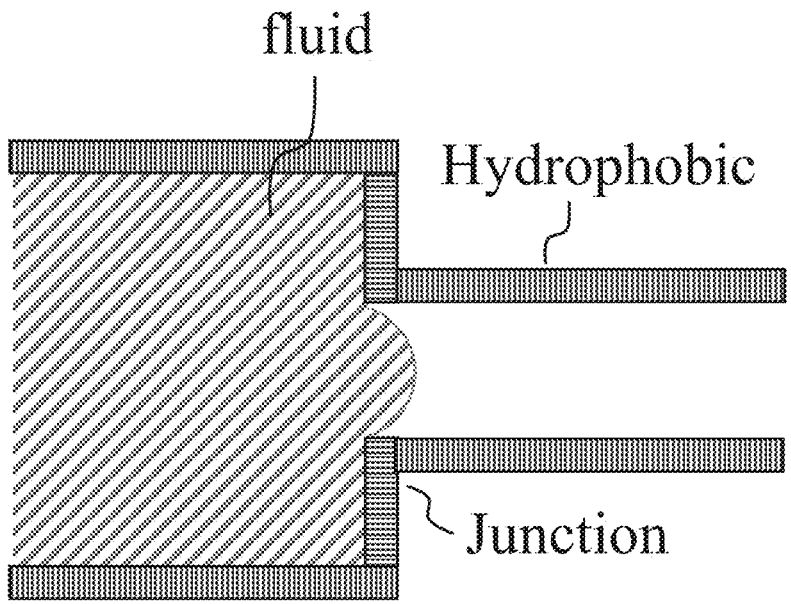
FIGS. 6A-6F illustrate examples of passive valves used in fluidic cartridges for sample analysis with serial dilution according to some embodiments of the disclosure.
Figure 6B:
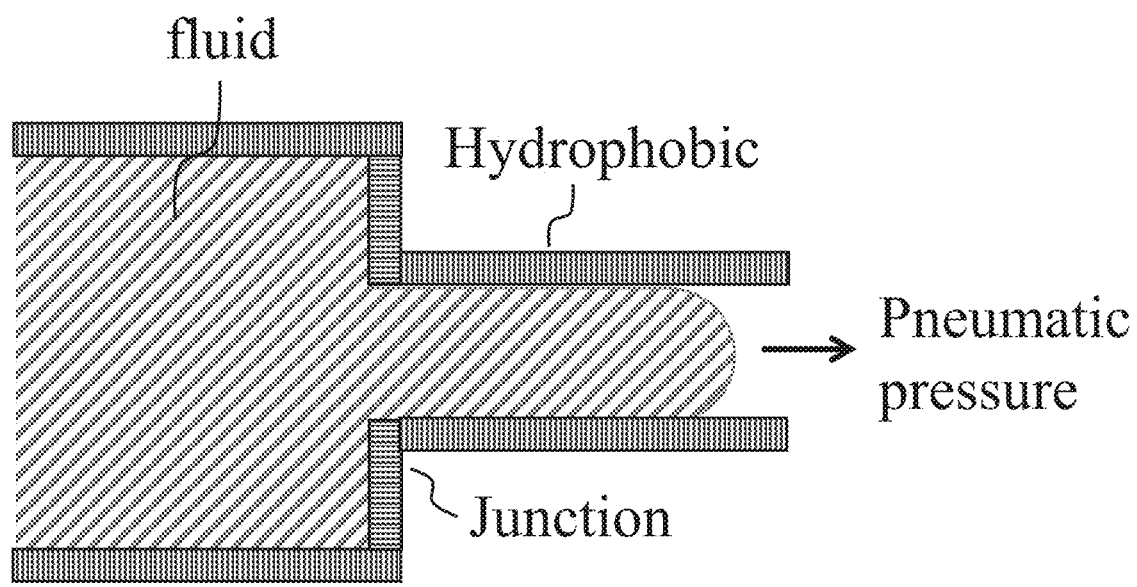
Figure 6C:
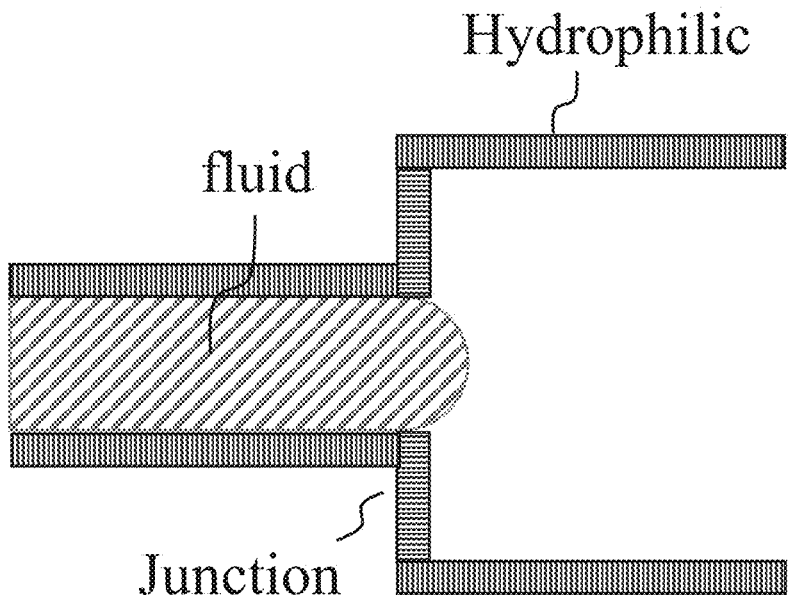
Figure 6D:
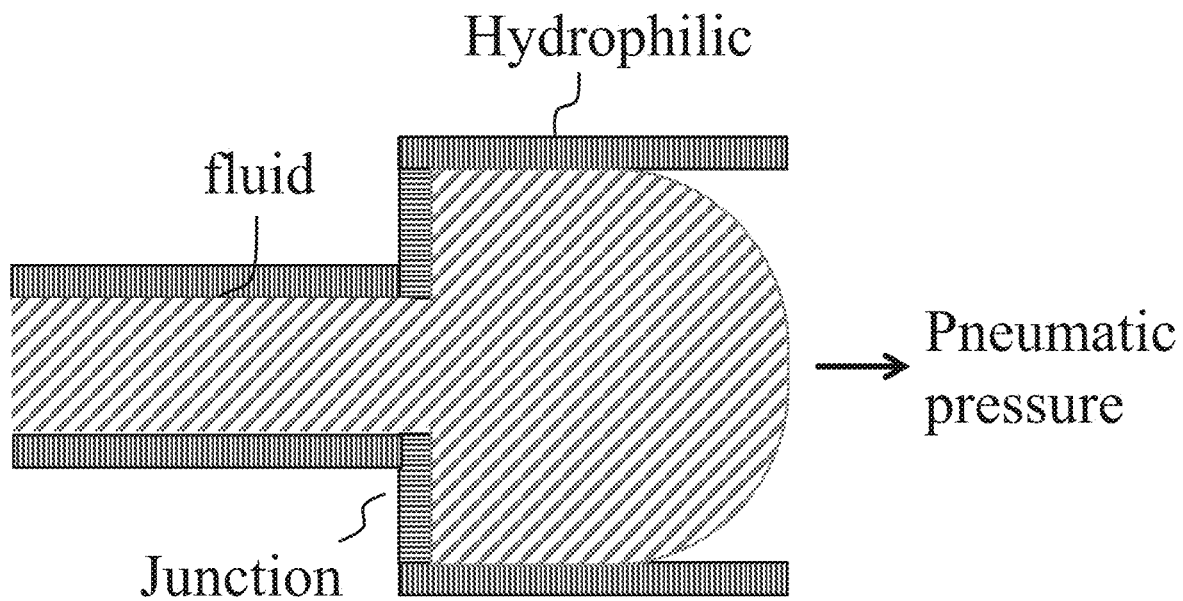
Figure 6E:
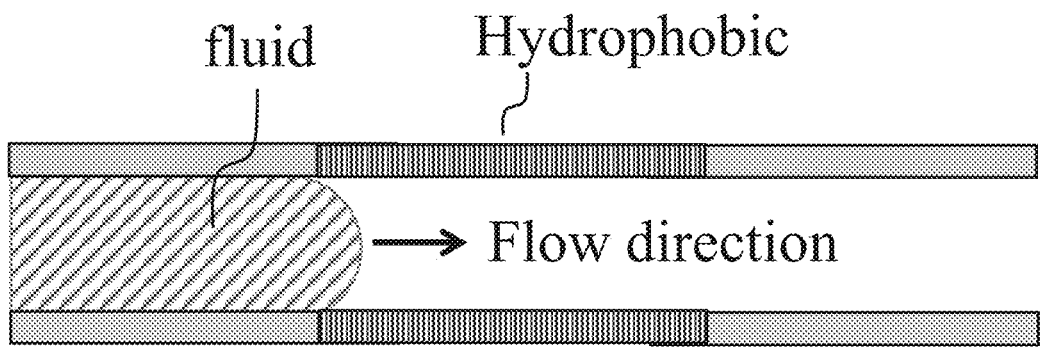
Figure 6F:
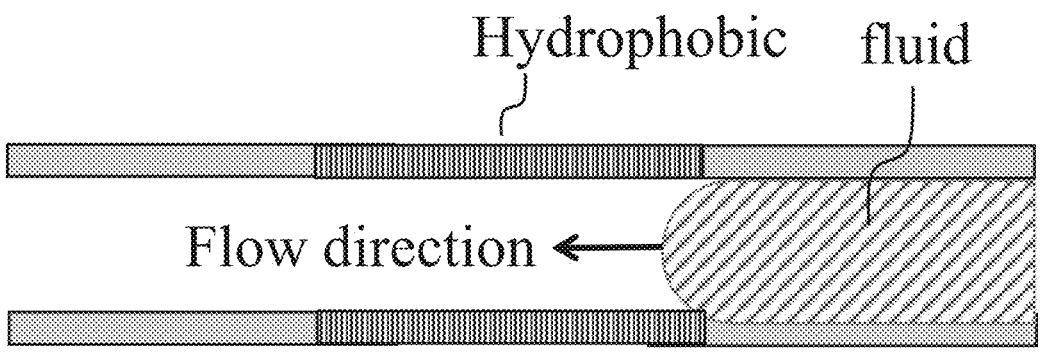

Various types of valves (e.g., passive valves or active valves) can be used as the valves 521, 522, 523, 524, 525, 526 and 527. In certain embodiments, passive valves are used. Non-limiting examples of the passive valves are shown in FIGS. 6A-6F. The valve in FIG. 6A may include a channel with a hydrophobic surface and a junction where the channel diameter quickly narrows down. When a fluid flow reaches the junction, a sudden increase of capillary force at the junction stops the flow and acts as a closed valve. To open the valve, a driving mechanism is applied to the fluid (e.g., a pneumatic pressure as shown in FIG. 6B) and pushes the fluid to pass the junction and flow into a downstream channel. The valve in FIG. 6C may include a channel with a hydrophilic surface and a junction where the channel diameter quickly enlarges. When a fluid flow reaches the junction, a sudden decrease of capillary force at the junction stops the flow as a closed valve. To open the valve, a driving mechanism is applied to the fluid (e.g., a pneumatic pressure as shown in FIG. 6D) and pushes the fluid to pass the junction and flow into a downstream channel. The valve of FIG. 6C works as a one-way valve, which only stops a fluid flow from the narrower side into the larger side of the junction. A non-limiting example of a two-way valve is shown in FIG. 6E and FIG. 6F, which may include a hydrophobic patch in a channel. When a fluid flow reaches the hydrophobic patch, the capillary force of the hydrophobic surface stops the fluid flow as a closed valve. This valve design stops flow along both directions of the channel, as shown in FIG. 6E and FIG. 6F.

Various types of valves can be used as the capillary valves 528 and 529. In certain embodiments, passive valves are used as the capillary valves. Non-limiting examples of the passive valves are shown in FIGS. 6A-6F as described herein.

Figure 5B:
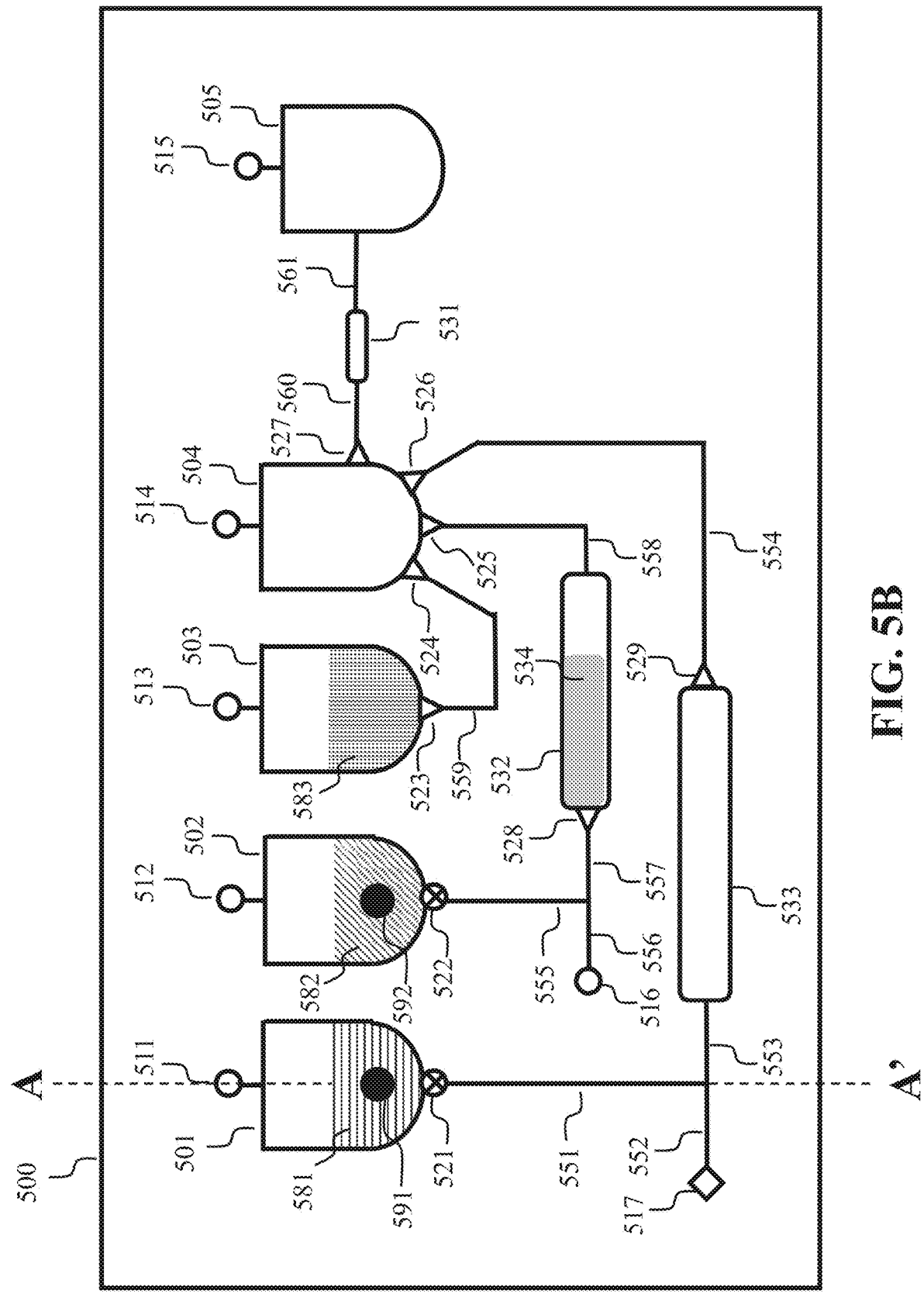

FIG. 5B shows another non-limiting example of a fluidic cartridge that implements a serial dilution method. This design is similar to the example of FIG. 5A, while uses active valves as the valve 521 and 522. This design may further include two actuation structures 591 and 592, which are used to open the valves 521 and 522, respectively. The operation of this design is also similar to the example of FIG. 5A. By using active valves, it introduces more options for the fluidic cartridge's functionality. In some embodiments, the first reagent 581 and the second reagent 582 are initially received in the chambers 501 and 502, and the valves 521 and 522 are initially closed to store the reagents within the chambers, respectively.

Various timings of opening the valves 521 and 522 can be used in the serial dilution for sample analysis (e.g., cytometry analysis and a CBC test). In some embodiments, the valves 521 and 522 are opened independently. In other embodiments, the valves 521 and 522 are opened together at one time. As a non-limiting example, the valves 521 and 522 are opened together when the fluidic cartridge is received in a reader instrument to perform a CBC test, for example, by an actuation module in the reader instrument. By opening the two valves in the same step, it simplifies the actuation mechanism to open the valves. Different strategies of fluidic transfer can be used when the two valves are opened together. As a non-limiting example, the venting port 514 is constantly connected to the ambient atmospheric pressure, while pneumatic pressures are applied to the ports 511 and 512, independently. By applying a pneumatic pressure at the port 511, it drives a reagent or a sample mixture to transfer between the chamber 501 and 504. By applying a pneumatic pressure at the port 512, it drives a reagent or a sample mixture to transfer between the chamber 502 and 504. These two transfer steps are controlled independently by the pneumatic pressures at the ports 511 and 512. Various strategies can be used for the fluidic transfer, and non-limiting examples of using pneumatic pressures to control the fluidic transfer are described in Patent Application Nos. PCT/US17/59965, 15/803,133, PCT/US17/62765, 15/819,416, 62/575,918, and PCT/US18/56725, which are incorporated herein by reference in their entirety as if fully set forth.

Figure 7A:
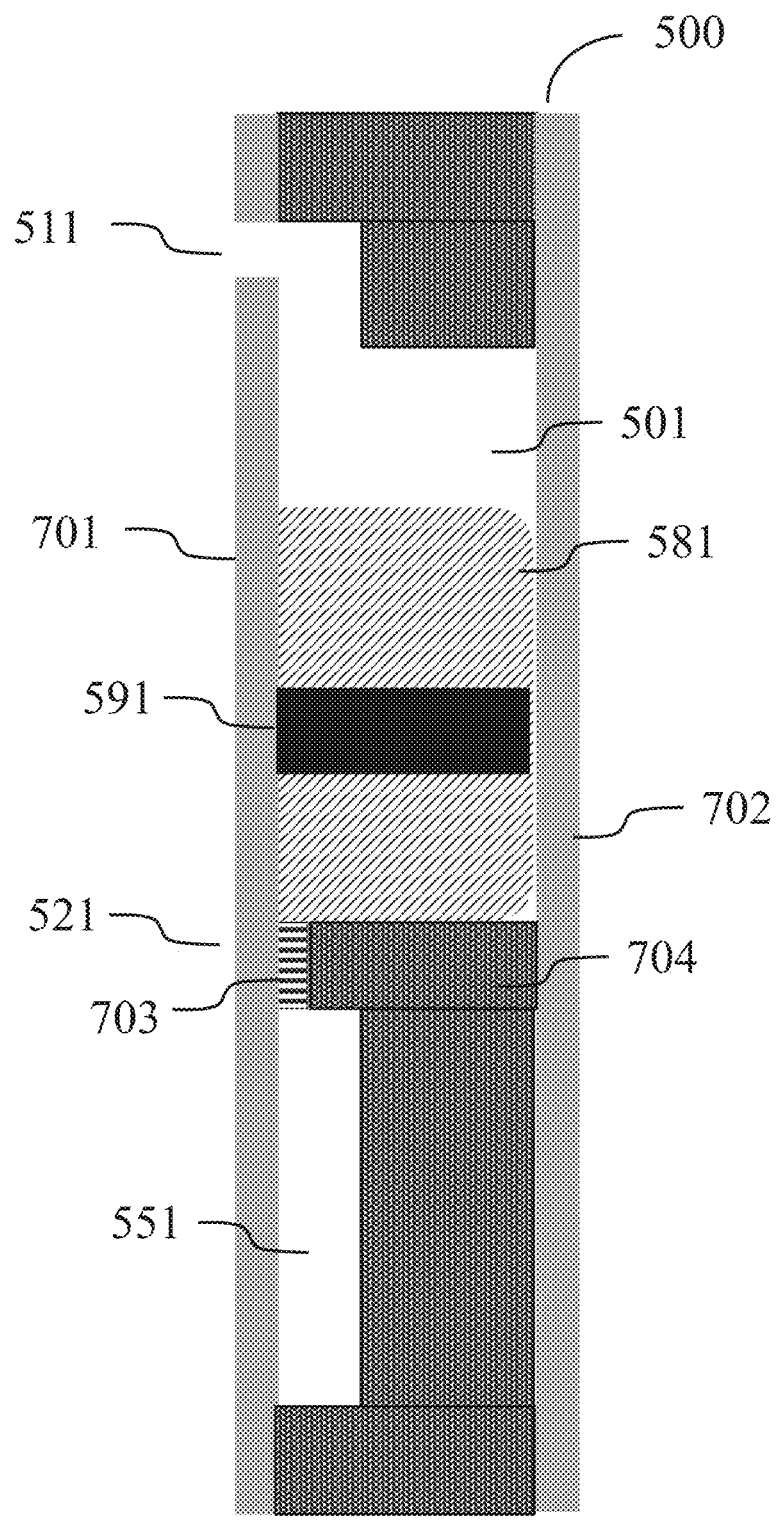
FIGS. 7A-7D illustrate examples of reagent storage units used in fluidic cartridges for sample analysis with serial dilution according to some embodiments of the disclosure.
Figure 7B:
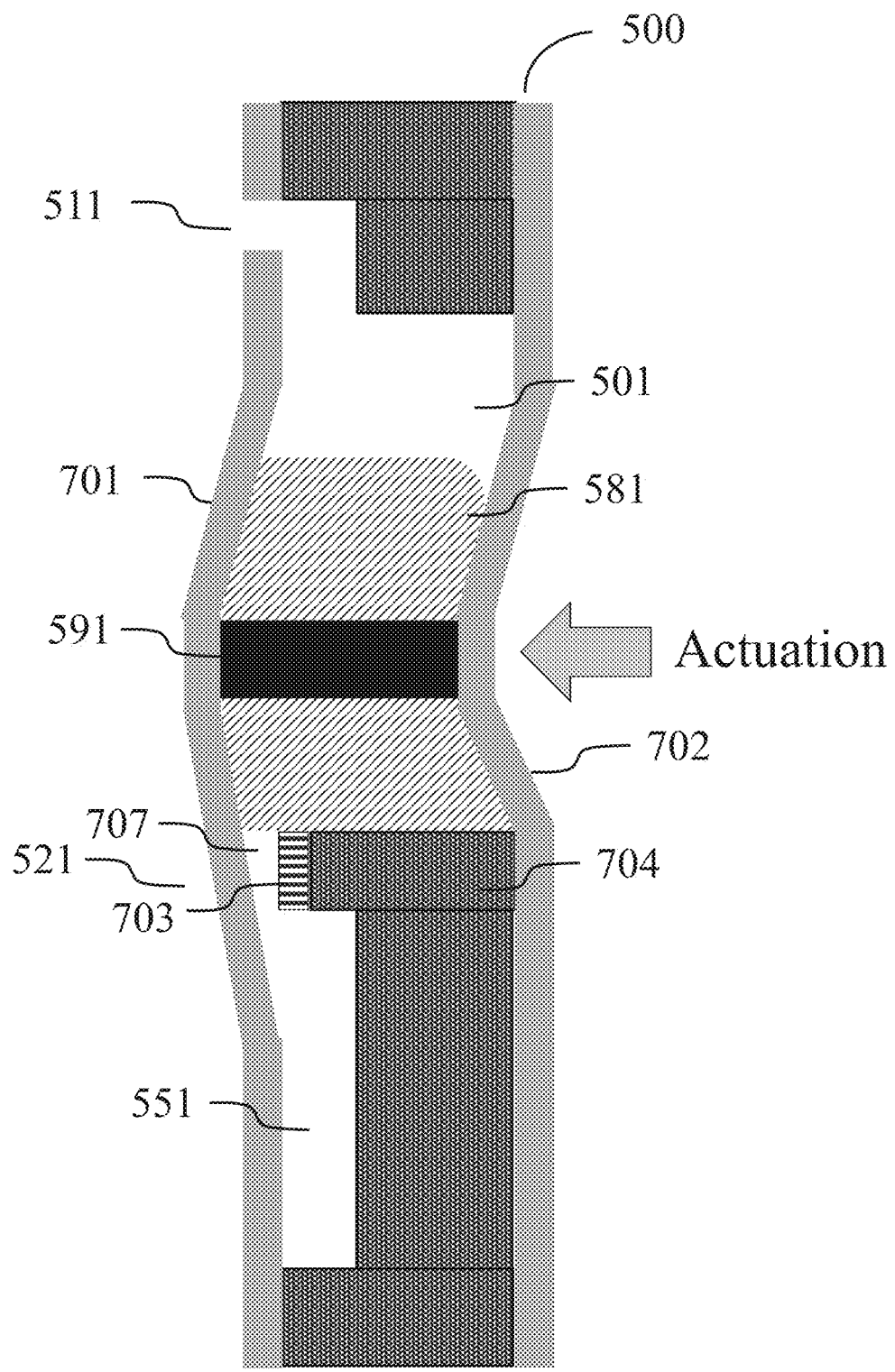

Various types of active valves can be used as the valves 521 and 522. In certain embodiments, a valve with a breakable bonding is used. FIG. 7A shows a non-limiting example of implementing an active valve with a breakable bonding in the fluidic cartridge 500 of FIG. 5B (cross-section view of the fluidic cartridge 500 along the line A-A'). In this example, the valve 521 may include a breakable bonding 703, which initially bonds a flexible membrane 701 to a solid wall 704 surrounding the chamber 501. When this bonding is intact, the valve 521 prevents the first reagent 581 in the chamber 501 from exiting into the fluidic conduit 551. By applying an actuation mechanism (e.g., deformation of a flexible membrane 702 that is supporting the actuation structure 591), the actuation structure 591 pushes the membrane 701 to break the bonding 703 and form a fluidic conduit 707, as shown in FIG. 7B. A driving mechanism applied to the first reagent 581 (e.g., a pneumatic pressure applied to the venting port 511) is able to transfer the reagent from the chamber 501 into the fluidic conduit 551 via the fluidic conduit 707. Various ways could be used to form the breakable bonding. A non-limiting example is a bonding formed by a layer of adhesive material. The adhesion layer bonds the membrane 701 to the solid wall 704. When the membrane 701 has a sufficiently large deformation, the adhesive layer delaminates from either the membrane 701 or the solid wall 704 so that the bonding is broken. Various ways could be used to provide the actuation mechanism. A non-limiting example is a mechanical push force applied on the membrane 702 to introduce the deformation.

Figure 7C:
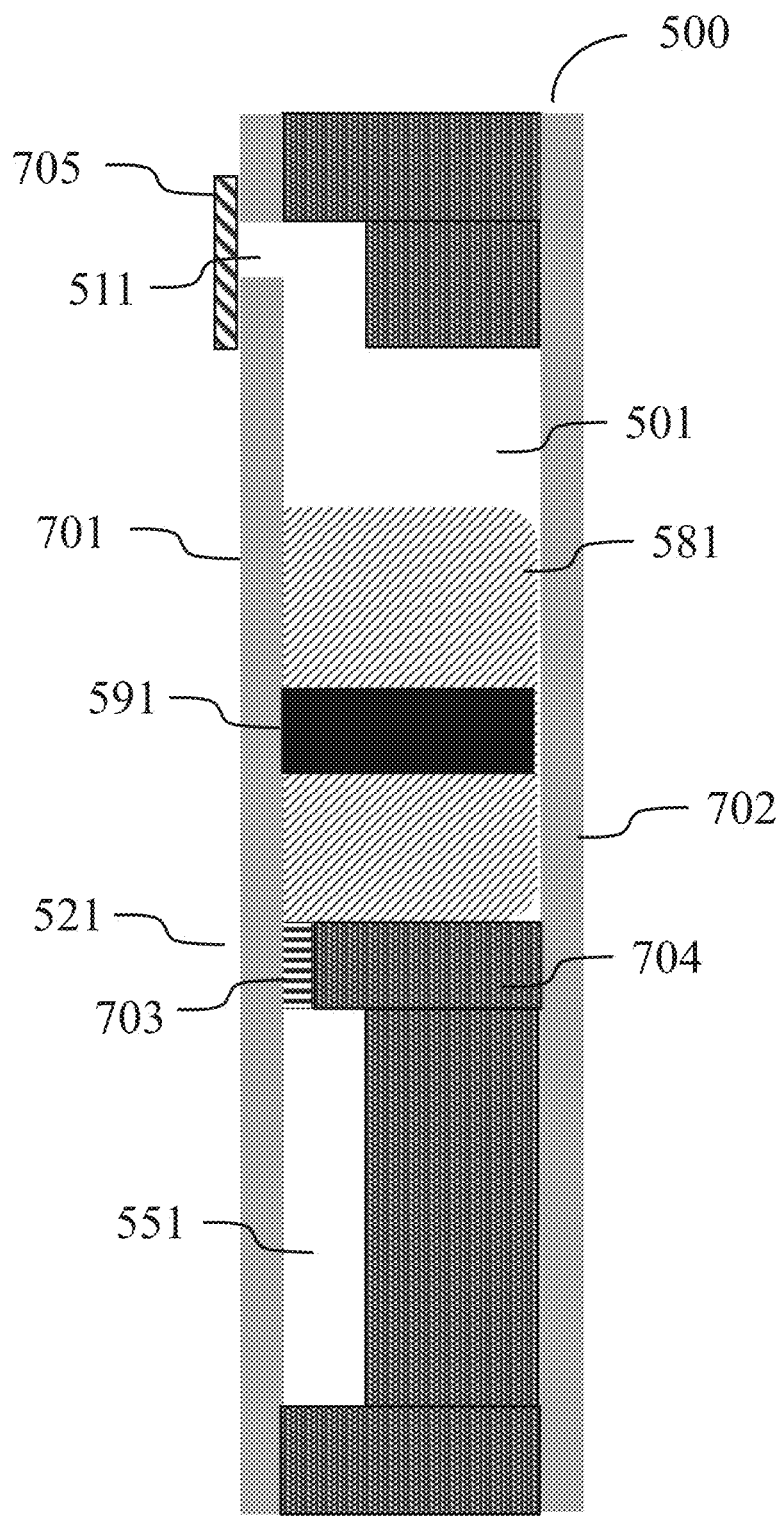

In some embodiments, a reagent storage unit is built into the fluidic cartridge for storage of a reagent in the cartridge. FIG. 7C shows a non-limiting example, which may include the chamber 501, the solid wall 704 forming the chamber, membranes 701 and 702, the valve 521 with the breakable bonding 703, the venting port 511 and a breakable seal 705 that closes up the venting port 511. After the reagent 581 is received in the chamber 501, the seal 705 is applied to close up the port 511. The seal 705, the valve 521, the membranes 701 and 702, and the solid wall 704 make the chamber 501 into a fully sealed container for storage of the reagent 581. By using materials with high water isolation properties for the seal, the valve, the membranes and the solid wall, this sealed container minimizes water vaporization and thus minimizes a volume loss of the stored reagent. Examples of the materials include but are not limited to aluminum foil, and plastic film with lower water permeability (e.g., Cyclo Olefin Polymer, Cyclic Olefin Copolymer, Polychlorotrifluoroethylene, and High-density Polyethylene, et cetera). In this way, the designated volume of reagent received in the chamber can be stored for long term without significant volume loss.

The seal 705 can be opened any time before or after the cartridge is received in the reader instrument for measurements. In a non-limiting example, the seal 705 is opened by a mechanical puncture after the fluidic cartridge is received into the reader instrument. To transfer the reagent 581 out of the chamber 501, the valve 521 is opened by breaking the bonding 703 and a driving mechanism is applied to the reagent to drive it into the fluidic conduit 551 for the serial dilution. In certain embodiments, a pneumatic pressure is applied to the venting port 511 as the driving mechanism of the reagent. By positioning the chamber in a vertical or slightly tilted position, as shown in FIG. 8C, gravity constantly pulls the reagent towards the bottom of the chamber 501. By further positioning the fluidic conduit 551 near the bottom of the chamber, the driving mechanism (e.g., the pneumatic pressure) is able to push the reagent 581 out of the chamber and into the fluidic conduit 551. In this way, the designated volume of reagent 581 can be transferred for serial dilution without significant dead volume.

Therefore, in this storage unit, a designated volume of reagent can be kept for long term without significant volume loss and further transferred for serial dilution without significant dead volume. Using this design, no additional metering of the reagent volume is necessary to ensure a target dilution ratio. In this way, the storage unit simplifies the cartridge design for implementing the serial dilution. In various embodiments, the storage unit is used to store a reagent volume in the range of about 10 to 50 µL, 50 to 100 µL, 100 to 200 µL, 200 to 500 µL, 500 to 1,000 µL, or 1,000 to 5,000 µL.

This reagent storage unit can be used in fluidic cartridges implementing a serial dilution method as described herein, as well as in fluidic cartridges implementing any other fluidic functionalities. For fluidic cartridges implementing a serial dilution method as described herein, various other types of reagent storage units can also be used. Non-limiting examples of other types of reagent storage units are described in US Patent Application Nos. 62/504,866, and PCT/US18/31893, which are incorporated herein by reference in its entirety as if fully set forth.

In various embodiments, the blood sample received in the fluidic cartridge device for measurements has a volume in the range of about 0.01 to 0.1 µL, 0.1 to 1 µL, 1 to 10 µL, or 10 to 100 µL. In various embodiments, a designated volume of the received blood sample is mixed with the first regent to form the sample mixture 1, and the designated volume is in the range of about 10% to 40%, 40% to 80%, 80% to 90%, 90% to 99%, or 99% to 100% of the volume of the received blood sample. In various embodiments, the first reagent has a volume in the range of about 10 to 50 µL, 50 to 100 µL, 100 to 200 µL, 200 to 500 µL, or 500 to 1,000 µL. In various embodiments, the sample mixture 1 has a dilution ration (i.e., the volume of mixed blood sample: the volume of mixed first reagent) in the range of about 1:5 to 1:10, 1:10 to 1:20, 1:20 to 1:50, or 1:50 to 1:100. In various embodiments, a designated volume of the sample mixture 1 is metered to mix with the second reagent to form the sample mixture 2. In various embodiments, the metered volume of the sample mixture 1 is in the range of about 0.1 to 1 µL, 1 to 10 µL or 10 to 100 µL. In various embodiments, the second reagent has a volume in the range of about 10 to 50 µL, 50 to 100 µL, 100 to 200 µL, 200 to 500 µL, or 500 to 1,000 µL. In various embodiments, the sample mixture 2 has a dilution ratio (i.e., the volume of metered sample mixture 1: the volume of mixed second reagent) in the range of about 1:5 to 1:10, 1:10 to 1:20, 1:20 to 1:50, or 1:50 to 1:100. In various embodiments when a fluid reagent is used as the third reagent, it has a volume in the range of about 0.1 to 1 µL, 1 to 10 µL, 10 to 100 µL, 100 to 200 µL, 200 to 500 µL, or 500 to 1,000 µL.

Figure 7D:
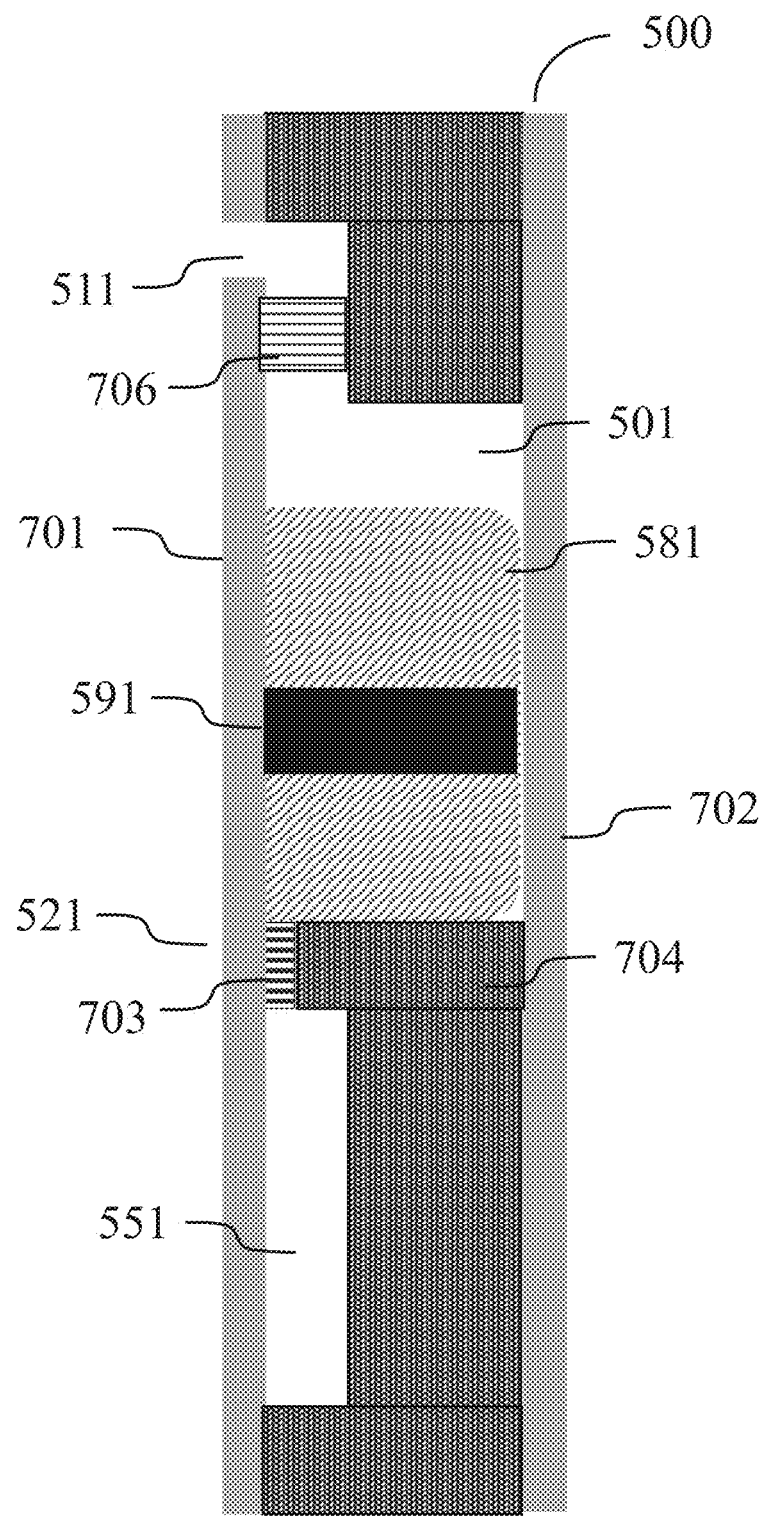

In certain embodiments, a filter structure is added to the fluidic cartridge 500 to prevent aerosols or liquids from exiting the cartridge. In a non-limiting example of FIG. 7D, a filter piece 706 is added between the chamber 501 and the venting port 511. This filter piece 706 may include a porous material, which allows air to pass through but stops aerosols or liquids. Examples of the porous material include but are not limited to Porex, porous polyethylene, porous PTFE, Versapor R membranes from Pall, and Aspire Microfiltration Membrane from Sterlitech, et cetera.

Figure 5C:
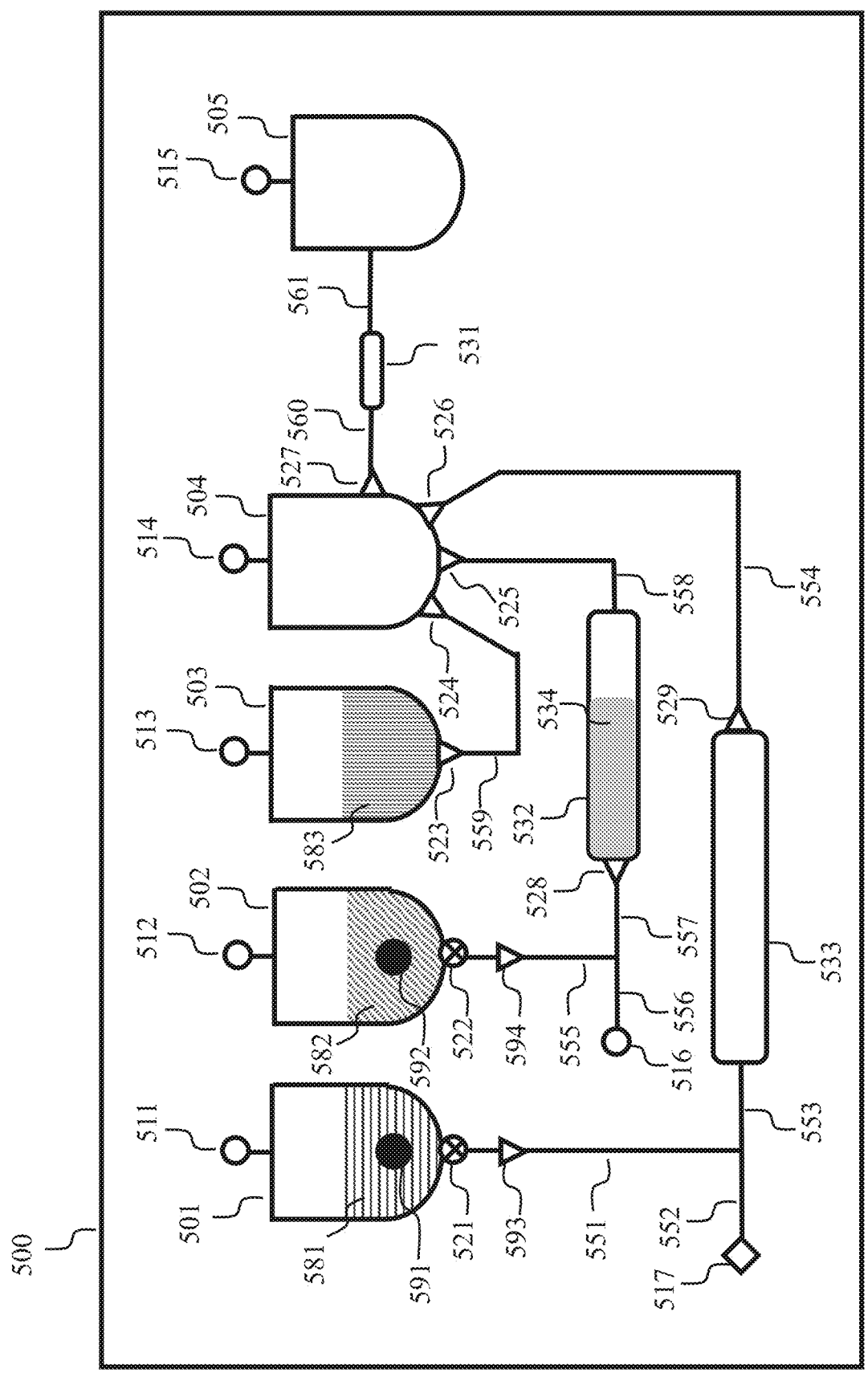

In some embodiments, multiple valves can be used in combination for a valve component in the fluidic cartridge 500, as shown in a non-limiting example in FIG. 5C. This design is similar to the designs of FIG. 5A and FIG. 5B with the following difference: it uses an active valve 521 plus a passive valve 593 for the valve component for the chamber 501, and an active valve 522 plus a passive valve 594 for the valve component for the chamber 502. The additional passive valves 593 and 594 help simplify the fluid transfer in the cartridge. For example, the active valve 521 is opened when the fluidic cartridge is received into a reader instrument, and the passive valve 593 prevents the first reagent 581 from entering the fluidic conduit 551 before a driving mechanism is applied.

Figure 5D:
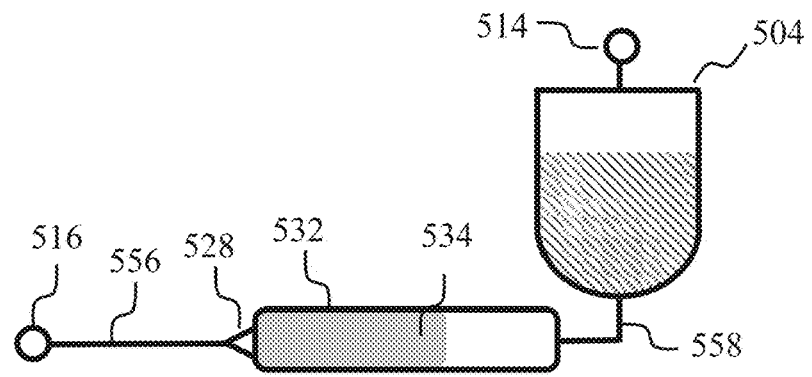
FIGS. 5D-5F illustrate examples of fluidic structures configured to meter a portion of a sample mixture according to some embodiments of the disclosure.

FIG. 5D illustrates a non-limiting example of a fluidic structure for metering a first portion of a sample mixture 1, which can be used for serial dilution and sample analysis. The fluidic structure may include a first chamber 504 configured for receiving a sample and a first reagent to form the sample mixture 1, and a metering chamber 532. The metering chamber 532 is connected to the first chamber 504 via a fluidic conduit 558 and is configured for metering a designated volume of the sample mixture 1. The fluidic structure may further include a venting port 514 connected to the first chamber 504 and a venting port 516 connected to the metering chamber 532. In various embodiments, the surfaces of the fluidic conduit 558 and the metering chamber 532 can be hydrophilic to provide capillary force to drive the sample mixture 1 to flow into the metering chamber 532. In some embodiments, the surface of metering chamber 532 can be hydrophilic. In some embodiments, a portion of the surface of the metering chamber 532 can be hydrophilic (e.g., a surface area 534 that is colored in grey in the drawing). In some embodiments, a hydrophilic surface described herein can be made from using intrinsically hydrophilic materials. In other embodiments, a hydrophilic surface described herein can be made from applying hydrophilic coatings to a non-hydrophilic surface. In various embodiments, the metering chamber 532 may further include a capillary valve 528 to stop the flow of the sample mixture 1 driven by capillary force.

To collect the first portion of the sample mixture 1 from the first chamber 504, a driving mechanism is applied to the fluidic structure to drive the sample mixture 1 exiting the first chamber 504 and entering the metering chamber 532. In various embodiments, the driving mechanism is a pneumatic force. As a non-limiting example of applying the pneumatic force, the venting port 516 is connected to a pressure lower than the ambient atmospheric pressure and the venting port 514 is connected to the ambient atmospheric pressure. As another non-limiting example of applying the pneumatic force, the venting port 516 is connected to the ambient atmospheric pressure and the venting port 514 is connected to a pressure higher than the ambient atmospheric pressure. In various embodiments, the driving mechanism can be other types of forces. Non-limiting examples of other types of forces include but are not limited to gravity, capillary force, electrophoresis, magnetic force, acoustic pressure force, and centrifugal force, and their combinations.

Figure 5E:
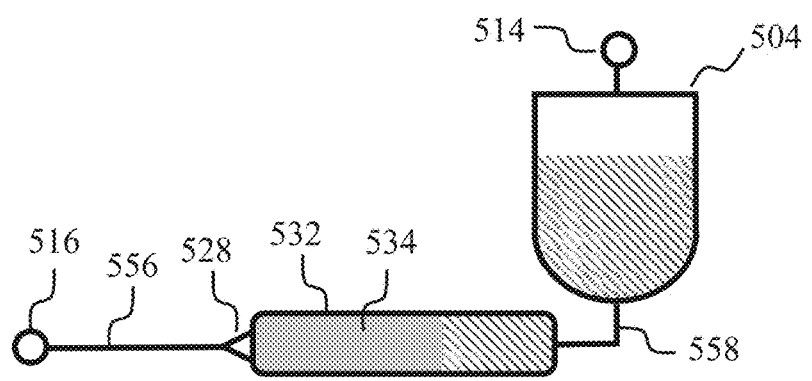
Figure 5F:
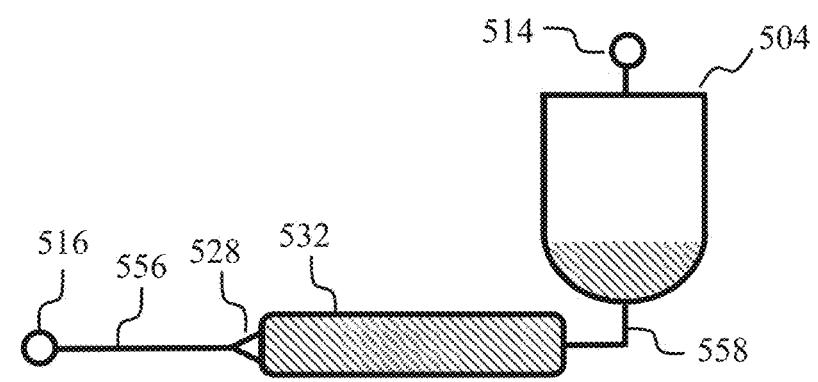

Driven by the applied driving mechanism, the sample mixture 1 exits the first chamber 504 and enters the metering chamber 532. The driving mechanism is removed after the sample mixture 1 contacts the hydrophilic surface area 534 in the metering chamber 532, as shown in FIG. 5E. The sample mixture 1 continues to flow and fill the metering chamber 532 driven by capillary force after the driving mechanism is removed. The flow of the sample mixture 1 stops at the capillary valve 528 and hence the first portion of sample mixture 1 with the designated volume is collected, as shown in FIG. 5F.

Figure 5G:
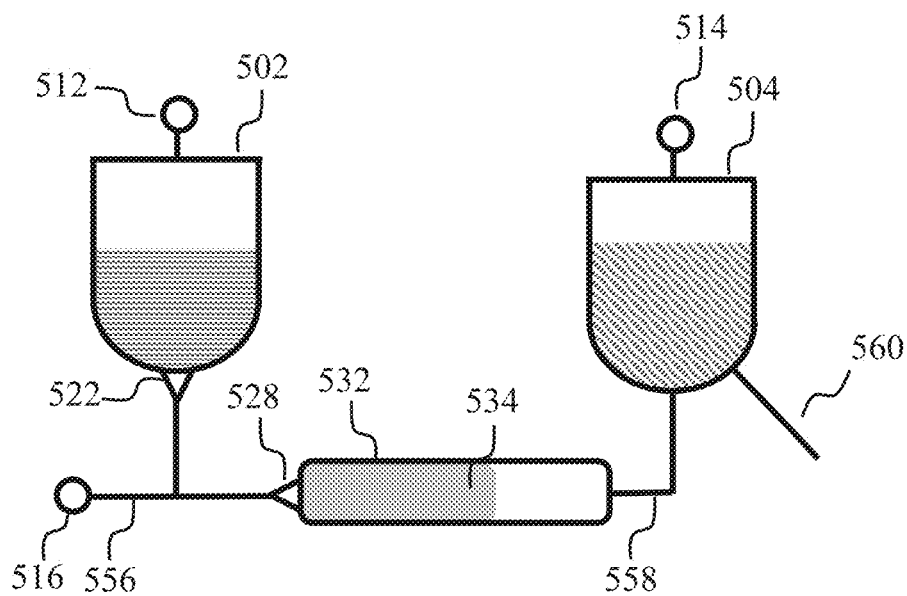
FIGS. 5G-5K illustrate examples of fluidic structures configured to perform serial dilution of a sample mixture according to some embodiments of the disclosure.

FIG. 5G illustrates a non-limiting example of a fluidic structure for implementing a serial dilution for various sample analysis methods. The fluidic structure may include a first chamber 504 configured for receiving a sample and a first reagent to form a sample mixture 1. The fluidic structure may further include a metering chamber 532 that is connected to the first chamber 504 via a fluidic conduit 558 and is configured for metering a designated volume of the sample mixture 1. The fluidic structure may further include a second chamber 502 configured for receiving a second reagent. The second chamber 502 is connected to the metering chamber 532 via a fluidic conduit 556 and a passive valve 522. The fluidic structure may further include a fluidic conduit 560 connected to the first chamber 504.

Figure 5H:
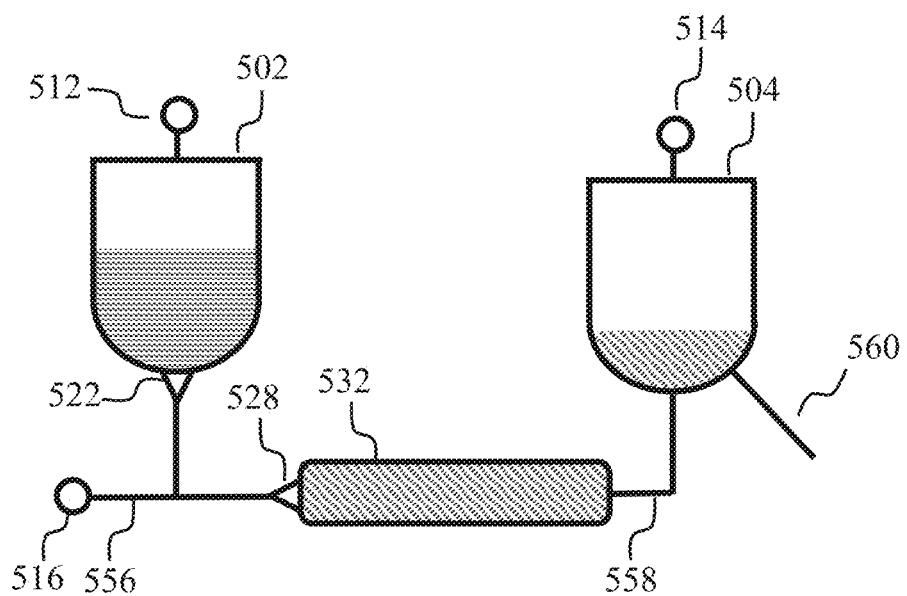
Figure 5I:
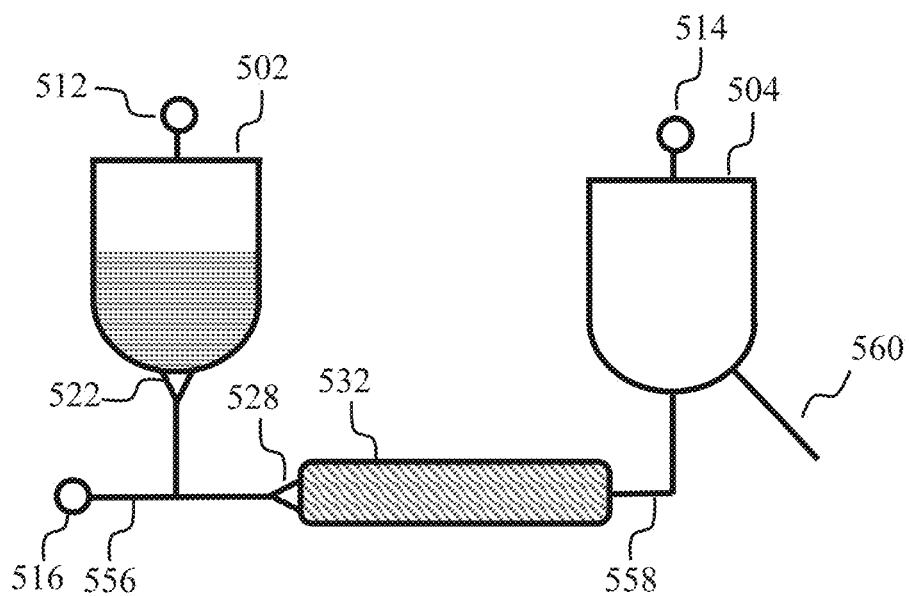

The sample and the first reagent are introduced into the first chamber 504 to form the sample mixture 1. By applying a driving mechanism as described herein, the sample mixture 1 enters the metering chamber 532. After the sample mixture 1 contacts a hydrophilic surface 534 of the metering chamber 532, the driving mechanism is removed. However, driven by capillary force, the sample mixture 1 continues to flow in the metering chamber and then stops at the capillary valve 528, as shown in FIG. 5H. After the first portion of the sample mixture 1 is collected in the metering chamber 532, the other portion of the sample mixture 1 remaining in the first chamber 504 is removed from the first chamber 504 via the fluidic conduit 560, as shown in FIG. 5I.

Figure 5J:
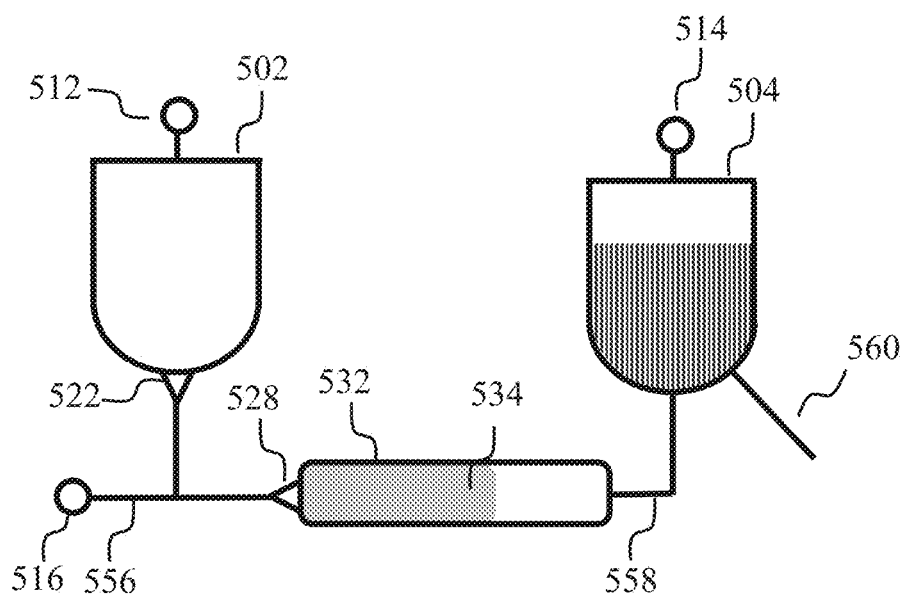

The second reagent in the second chamber 502 and the first portion of the sample mixture 1 in the metering chamber 532 are then introduced into the first chamber 504 to form a sample mixture 2 by a driving mechanism, as shown in FIG. 5J. The driving mechanism can be a pneumatic force and other types of forces. Non-limiting examples of other types of forces include but are not limited to gravity, capillary force, electrophoresis, magnetic force, acoustic pressure force, and centrifugal force, and their combinations. As a non-limiting example of applying the pneumatic force, both the venting ports 512 and 516 are connected to a pneumatic pressure higher than the ambient atmospheric pressure and the venting port 514 is connected to the ambient atmospheric pressure. As another example of applying the pneumatic force, both the venting ports 512 and 516 are connected to the ambient atmospheric pressure and the venting port 514 is connected to a pneumatic pressure low than the ambient atmospheric pressure. In some embodiments, the pneumatic pressure on the venting ports 512 and 516 can be applied simultaneously to drive the second reagent and the first portion of the sample mixture 1 into the first chamber 504. In other embodiments, the pneumatic pressure can be applied sequentially on the venting ports 512 and 516 to drive the second reagent and the first portion of the sample mixture 1 into the first chamber 504.

Figure 5K:
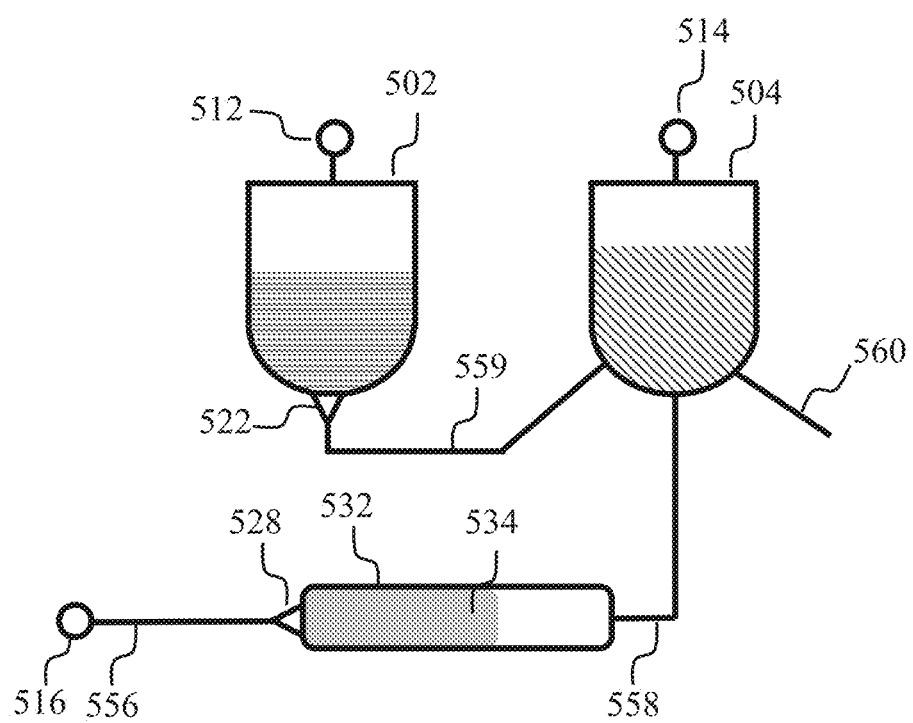

FIG. 5K illustrates another non-limiting example of the fluidic structure for implementing a serial dilution for various sample analysis methods. The fluidic structure may include a first chamber 504, a metering chamber 532, and a second chamber 502 that is connected to the first chamber 504 via a fluidic conduit 559. The second chamber 502 receives a second reagent before the serial dilution. After a first portion of the sample mixture 1 is collected in the metering chamber 532, the other portion of the sample mixture 1 remaining in the first chamber 504 is removed from the first chamber 504 via a fluidic conduit 560. Then, the second reagent in the second chamber 502 and the first portion of the sample mixture 1 are introduced into the first chamber 504 to form a sample mixture 2 by a driving mechanism as described herein.

Figure 8A:
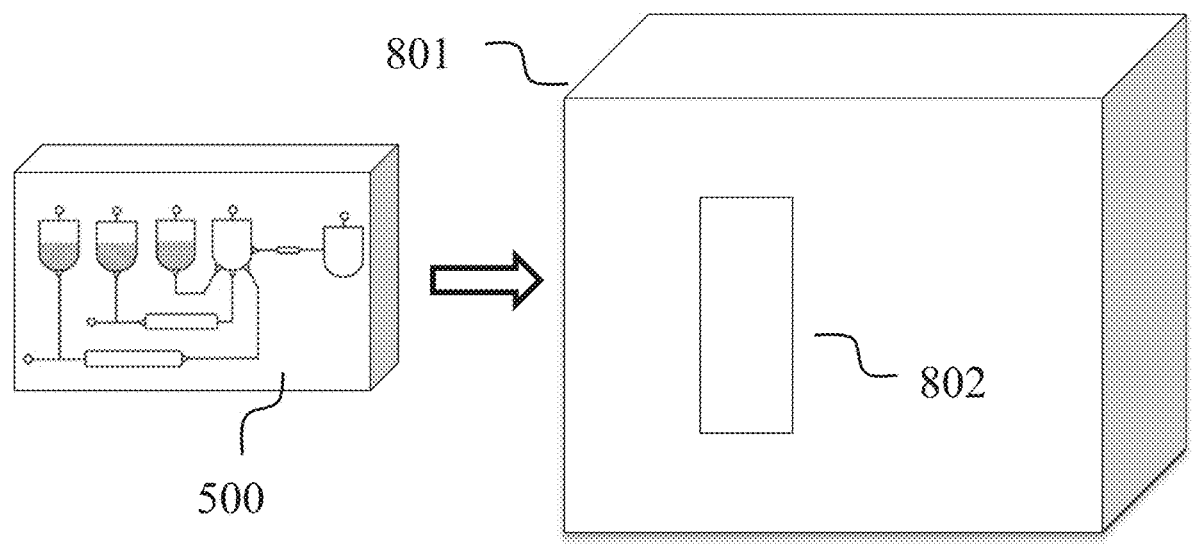
FIG. 8A illustrates a fluidic cartridge device and a reader instrument configured to receive the fluidic cartridge device according to some embodiments of the disclosure.

In some embodiments, the fluidic cartridge 500 is received in a reader instrument 801 to perform the serial dilution and sample analysis (e.g., cytometry analysis), as shown in FIG. 8A. The reader instrument 801 has a docking entrance 802 to receive the cartridge into the instrument. In certain embodiments, the docking entrance 802 is covered with a light-shielding door after receiving the cartridge, which shields the cartridge from ambient light during sample analysis (e.g., cytometry analysis).

Figure 8B:
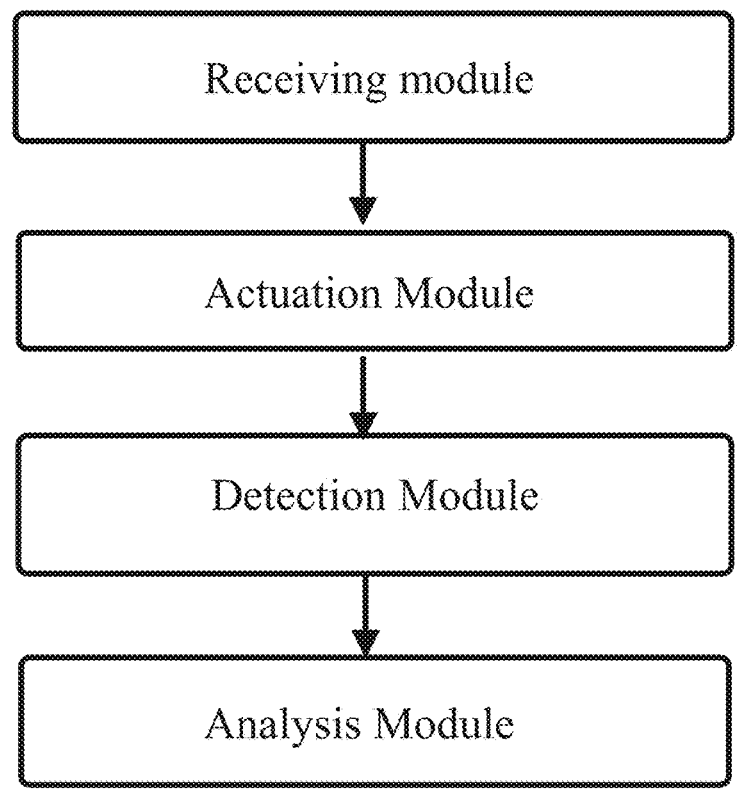
FIG. 8B illustrates function modules in a reader instrument according to some embodiments of the disclosure.
Figure 8C:
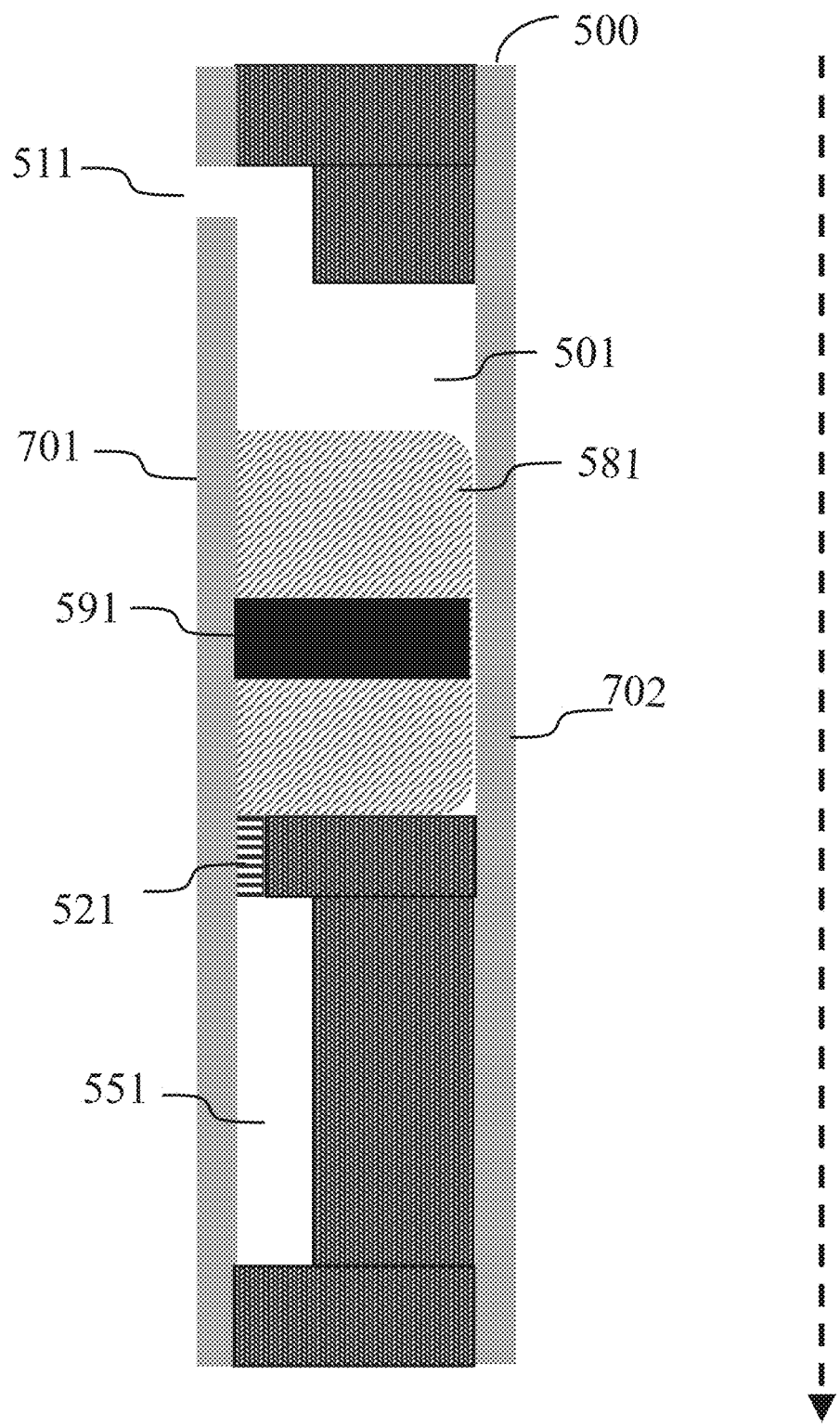
FIG. 8C illustrates the orientation of a fluidic cartridge device after being received in a reader instrument according to some embodiments of the disclosure.

As a non-limiting example, FIG. 8B shows the function modules in a reader instrument, including a receiving module, an actuation module, a detection module, and an analysis module. The receiving module establishes an interface between the fluidic cartridge and the reader instrument. For example, when a pneumatic pressure is applied to a venting port of the cartridge, a pneumatic connection is needed between the venting port on the cartridge and a pneumatic source in the reader instrument. The actuation module applies one or more actuation mechanisms to assist the operation of the cartridge. For example, the actuation module may include a pneumatic source as described herein. For another example, the actuation module may include a mechanical actuator to open an active valve in the fluidic cartridge. The detection module measures a signal from the cartridge for sample analysis (e.g., cytometry analysis). The analysis module processes the measured signal to deliver measurement results (e.g., results of a CBC test).

In certain embodiments, after the fluidic cartridge is received in the reader instrument, it is positioned in an orientation in which gravity pulls a fluid reagent away from a chamber's venting port and towards the chamber's bottom. FIG. 8C shows one non-limiting example of such an orientation. In this example, gravity pulls the fluid reagent 581 away from the venting port 511 and towards the bottom of the chamber 501. In this orientation, an air gap is created between the venting port 511 and the fluid reagent 581. Meanwhile, the channel 551 accesses a point of the chamber 501 that is lower in height than the fluid sample 581. In this way, the fluid reagent 581 can be driven into the channel 551 to form a diluted sample mixture.

In various embodiments, the cartridge is positioned in an orientation in which gravity pulls a fluid reagent away from a chamber's venting port and towards the chamber's bottom. In various embodiments, the chamber is configured for storing the fluid reagent. In this orientation, an air gap is formed between the venting port and the fluid reagent. Meanwhile, a channel accesses the chamber at a point that is below the top surface of the fluid reagent. In this way, the fluid reagent can be driven into the channel to form a diluted sample mixture.

In various embodiments, the cartridge is positioned in an orientation in which gravity pulls a fluid reagent away from a chamber's venting port and towards the chamber's bottom. In various embodiments, the chamber is configured for forming a diluted sample mixture. In this orientation, an air gap is formed between the venting port and the diluted sample mixture. Meanwhile, a channel accesses the chamber at a point that below the top surface of the diluted sample mixture. In this way, the diluted sample mixture can be transferred out of the chamber via the channel for additional operation. In some embodiments, the diluted sample mixture is transferred out of the chamber via the channel into a flow cell to form a sample stream for cytometer analysis. In some embodiments, bubbles are introduced into a sample mixture to assist mixing between a sample and a reagent, and gravity helps to float the bubbles towards the venting ports. As the bubbles float to the top surface of the sample mixture and burst, the amount of bubbles in the sample mixture is reduced.

Figure 9A:
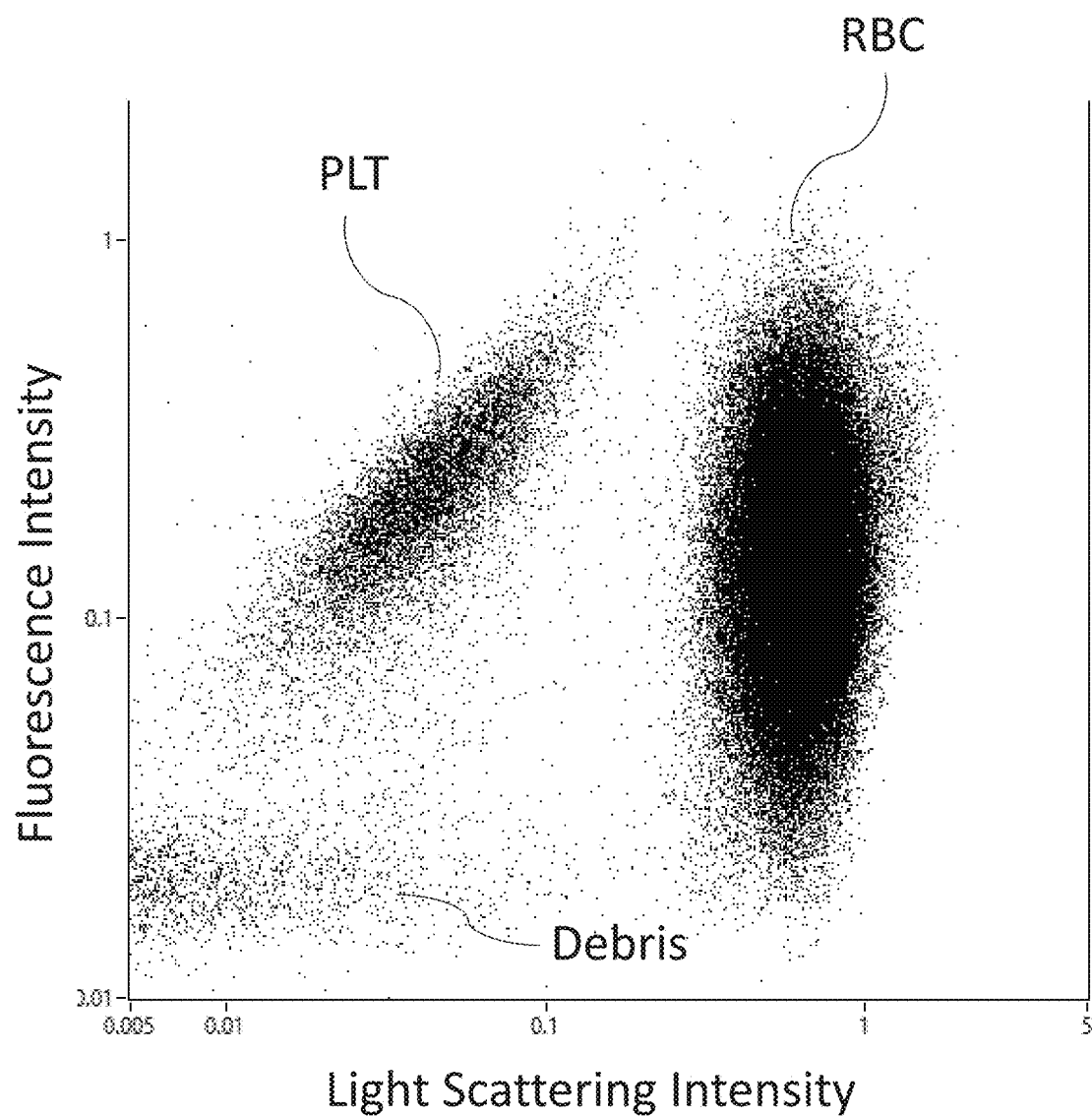
FIGS. 9A-9B illustrate examples of CBC test results obtained using a serial dilution method in a fluidic cartridge device according to some embodiments of the disclosure.

FIG. 9A shows a non-limiting example of RBC and PLT measurements with a serial dilution method as described herein in a fluidic cartridge. In this example, either the first reagent or the second reagent may include a fluorescent dye, and optical signals including fluorescence light and light scattering are measured to detect RBCs and PLTs. The fluorescence intensities and the scattered light intensities of the detected particles are analyzed in the format of a scatter plot, where the detected particles are distinguished into three distinct clusters corresponding to RBCs, PLTs and debris.

Figure 9B:
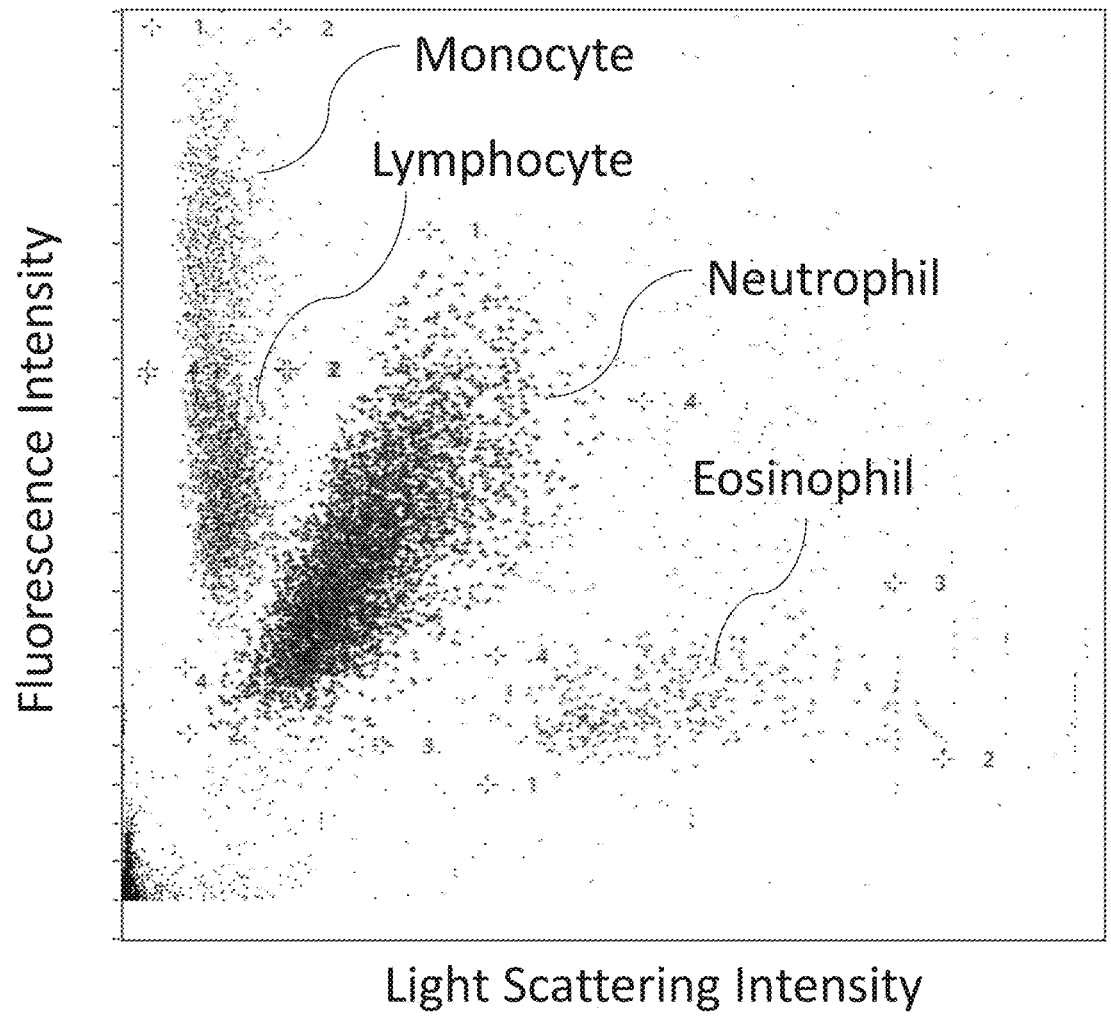

FIG. 9B shows a non-limiting example of WBC measurements with a serial dilution method as described in a fluidic cartridge. In this example, either the first reagent or the third reagent may include a fluorescent dye, and optical signals including fluorescence light and light scattering are measured to detect WBCs. The fluorescence intensities and the scattered light intensities of the detected particles are analyzed in the format of a scatter plot, where the detected WBCs are distinguished into four distinct clusters corresponding to four WBC subtypes including lymphocytes, monocytes, neutrophils, and eosinophils.

Serial dilution methods as described herein for sample analysis (e.g., cytometry analysis) can be used to measure additional CBC parameters, which include but are not limited to hemoglobin, hematocrit, reticulocyte count, nucleated RBC count, RBC indices (e.g., mean corpuscular volume, mean corpuscular hemoglobin, mean corpuscular hemoglobin concentration, and red cell distribution width, et cetera), and platelet indices (e.g., mean platelet volume, plateletcrit, platelet distribution width, and platelet large cell ratio, et cetera).

Many variations and alternative elements have been disclosed in embodiments of the present disclosure. Still further variations and alternate elements will be apparent to one of skill in the art. Among these variations, without limitation, are the selection of fluidic units, components and structures for the inventive devices and methods, and the samples that may be analyzed therewith. Various embodiments of the disclosure can specifically include or exclude any of these variations or elements.

In some embodiments, the numbers expressing quantities of ingredients, properties such as concentration, reaction conditions, and so forth, used to describe and claim certain embodiments of the disclosure are to be understood as being modified in some instances by the term "about." As one non-limiting example, one of ordinary skill in the art would generally consider a value difference (increase or decrease) no more than 10% to be in the meaning of the term "about." Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclosure may contain certain errors necessarily resulting from the standard deviation found in their respective testing measurements.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The disclosure is explained by various examples, which are intended to be purely exemplary of the disclosure and should not be considered as limiting the disclosure in any way. Various examples are provided to better illustrate the claimed disclosure and are not to be interpreted as limiting the scope of the disclosure. To the extent that specific materials are mentioned, it is merely for purposes of illustration and is not intended to limit the disclosure. One skilled in the art may develop equivalent means or reactants without the exercise of inventive capacity and without departing from the scope of the disclosure.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included, and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the disclosure are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the disclosure known to the applicant at this time of filing the application has been presented and is intended for the purposes of illustration and description. The present description is not intended to be exhaustive nor limit the disclosure to the precise form disclosed and many modifications and variations are possible in the light of the above teachings. The embodiments described explain the principles of the disclosure and its practical application and to enable others skilled in the art to utilize the disclosure in various embodiments and with various modifications as are suited to the particular use contemplated. Therefore, it is intended that the disclosure is not limited to the particular embodiments disclosed for carrying out the disclosure.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure.

Additional Aspects of the Present Disclosure

Aspects of the subject matter described herein may be useful alone or in combination with any one or more of the other aspects described herein. Without limiting the foregoing description, in a first aspect of the present disclosure, a device may include a fluidic cartridge that may include: a first chamber configured for receiving a sample and a first reagent to form a sample mixture 1; and a metering chamber connected to the first chamber and configured for metering a first portion of the sample mixture 1.

In accordance with a second aspect of the present disclosure, which may be used in combination with any other aspect or combination of aspects listed herein, the metering chamber may include a surface and at least a portion of the surface is hydrophilic.

In accordance with a third aspect of the present disclosure, which may be used in combination with any other aspect or combination of aspects listed herein, the metering chamber may include a capillary valve.

In accordance with a fourth aspect of the present disclosure, which may be used in combination with any other aspect or combination of aspects listed herein, the metering chamber is connected to a venting port.

In accordance with a fifth aspect of the present disclosure, which may be used in combination with any other aspect or combination of aspects listed herein, the metering chamber is connected to a chamber having a venting port.

In accordance with a sixth aspect of the present disclosure, which may be used in combination with any other aspect or combination of aspects listed herein, the connection between the metering chamber and the chamber having a venting port may include a valve.

In accordance with a seventh aspect of the present disclosure, which may be used in combination with any other aspect or combination of aspects listed herein, the first reagent is a liquid reagent.

In accordance with an eighth aspect of the present disclosure, which may be used in combination with any other aspect or combination of aspects listed herein, a device as described herein may further include a reader instrument that is configured to receive the fluidic cartridge and perform sample analysis.

In accordance with a ninth aspect of the present disclosure, which may be used in combination with any other aspect or combination of aspects listed herein, the reader instrument is configured to apply a driving mechanism to the fluidic cartridge to meter the first portion of the sample mixture 1 in the metering chamber.

In accordance with a tenth aspect of the present disclosure, which may be used in combination with any other aspect or combination of aspects listed herein, the driving mechanism is a pneumatic force.

In accordance with an eleventh aspect of the present disclosure, which may be used in combination with any other aspect or combination of aspects listed herein, the driving mechanism is started to drive the sample mixture 1 to contact a hydrophilic surface in the metering chamber.

In accordance with a twelfth aspect of the present disclosure, which may be used in combination with any other aspect or combination of aspects listed herein, the driving mechanism is stopped after the sample mixture 1 contacts a hydrophilic surface in the metering chamber.

In accordance with a thirteenth aspect of the present disclosure, which may be used in combination with any other aspect or combination of aspects listed herein, the reader instrument is configured to receive the fluidic cartridge in such an orientation that gravity pulls a fluid inside a chamber of the fluidic cartridge away from the chamber's venting port.

In accordance with a fourteenth aspect of the present disclosure, which may be used in combination with any other aspect or combination of aspects listed herein, the fluidic cartridge may further include a fluidic structure configured for mixing the first portion of the sample mixture 1 with a second reagent to form a sample mixture 2.

In accordance with a fifteenth aspect of the present disclosure, which may be used in combination with any other aspect or combination of aspects listed herein, the fluidic structure may include a second chamber connected to the metering chamber and configured for receiving the second reagent before the second reagent is mixed with the first portion of the sample mixture 1.

In accordance with a sixteenth aspect of the present disclosure, which may be used in combination with any other aspect or combination of aspects listed herein, the connection between the metering chamber and the second chamber may include a valve, a passive valve, or an active valve.

In accordance with a seventeenth aspect of the present disclosure, which may be used in combination with any other aspect or combination of aspects listed herein, the fluidic cartridge may further include a reagent storage unit that may include a storage chamber configured for accommodating a fluid and a valve with a breakable bonding.

In accordance with a eighteenth aspect of the present disclosure, which may be used in combination with any other aspect or combination of aspects listed herein, the fluidic cartridge may further include a flow cell configured to form a sample stream from a sample mixture in the fluidic cartridge.

In accordance with a nineteenth aspect of the present disclosure, which may be used in combination with any other aspect or combination of aspects listed herein, a method may include using a fluidic cartridge to receive a sample. The fluidic cartridge may include: a first chamber configured for receiving a sample and a first reagent to form a sample mixture 1; and a metering chamber connected to the first chamber and configured for metering a first portion of the sample mixture 1; and placing the fluidic cartridge into a reader instrument to perform sample analysis of the sample.

In accordance with a twentieth aspect of the present disclosure, which may be used in combination with any other aspect or combination of aspects listed herein, the reader instrument applies a driving mechanism to the fluidic cartridge to meter the first portion of the sample mixture 1 in the metering chamber.

In accordance with a twenty-first aspect of the present disclosure, which may be used in combination with any other aspect or combination of aspects listed herein, the sample mixture 1 is removed from the first chamber after the first portion of the sample mixture 1 is metered.

In accordance with a twenty-second aspect of the present disclosure, which may be used in combination with any other aspect or combination of aspects listed herein, the fluidic cartridge is configured for mixing a second portion of the sample mixture 1 with a third reagent to form a sample mixture 3.

In accordance with a twenty-third aspect of the present disclosure, which may be used in combination with any other aspect or combination of aspects listed herein, the third reagent is a dry or dried reagent.

In accordance with a twenty-fourth aspect of the present disclosure, which may be used in combination with any other aspect or combination of aspects listed herein, the fluidic cartridge may further include a flow cell configured to form a sample stream from a sample mixture in the fluidic cartridge, and the reader instrument measures cells, particles, or analytes, or a combination thereof in the sample stream.

In accordance with a twenty-fifth aspect of the present disclosure, which may be used in combination with any other aspect or combination of aspects listed herein, the fluidic cartridge may further include two reagent storage units, and each reagent storage unit may include a storage chamber configured for accommodating a fluid and a valve with a breakable bonding.

In accordance with a twenty-sixth aspect of the present disclosure, which may be used in combination with any other aspect or combination of aspects listed herein, a method may include using a fluidic cartridge to receive a sample and a first reagent to form a sample mixture 1; using a metering chamber in the fluidic cartridge to meter a first portion of the s ample mixture 1; using the fluidic cartridge to mix the first portion of the sample mixture 1 with a second reagent to form a sample mixture 2; and using a reader instrument to measure a signal from the sample mixture 1, or sample mixture 2, or both in the fluidic cartridge.

In accordance with a twenty-seventh aspect of the present disclosure, which may be used in combination with any other aspect or combination of aspects listed herein, the reader instrument applies a driving mechanism to the metering chamber to meter the first portion of the sample mixture 1.

In accordance with a twenty-eighth aspect of the present disclosure, which may be used in combination with any other aspect or combination of aspects listed herein, the osmolarity of the first reagent is about 140-160, 160-180, 180-200, 200-220, 220-240, 240-260, 260-280, 280-300, 300-320, 320-340, 340-360, 360-380, or 380-400 mOsm/L.

In accordance with a twenty-ninth aspect of the present disclosure, which may be used in combination with any other aspect or combination of aspects listed herein, an RBC lysing compound is introduced into a chamber, and then the first portion of the sample mixture 1 and the second reagent are introduced into the chamber to form the sample mixture 2.

In accordance with a thirtieth aspect of the present disclosure, which may be used in combination with any other aspect or combination of aspects listed herein, a method as described herein may further include using a flow cell in the fluidic cartridge to form a sample stream from a sample mixture in the fluidic cartridge, and using the reader instrument to measure cells, particles, or analytes, or a combination thereof in the sample stream.

In accordance with a thirty-first aspect of the present disclosure, which may be used in combination with any other aspect or combination of aspects listed herein, a method as described herein may further include using the reader instrument to measure cells, RBCs, PLTs, particles, or analytes, or a combination thereof in the sample stream formed from the sample mixture 2.

In accordance with a thirty-second aspect of the present disclosure, which may be used in combination with any other aspect or combination of aspects listed herein, a method as described herein may further include using the fluidic cartridge to mix a second portion of the sample mixture 1 with a third reagent to form a sample mixture 3.

In accordance with a thirty-third aspect of the present disclosure, which may be used in combination with any other aspect or combination of aspects listed herein, the third reagent may include an RBC lysing compound.

In accordance with a thirty-fourth aspect of the present disclosure, which may be used in combination with any other aspect or combination of aspects listed herein, a method as described herein may further include using a flow cell in the fluidic cartridge to form a sample stream from the sample mixture 3 in the fluidic cartridge and using the reader instrument to measure cells, WBCs, hemoglobin, particles, or analytes, or a combination thereof in the sample stream formed from the sample mixture 3.

In accordance with a thirty-fifth aspect of the present disclosure, which may be used in combination with any other aspect or combination of aspects listed herein, a method as described herein may further include measuring the sample mixture 2 in a flow cell in the fluidic cartridge before measuring the sample mixture 3 in the flow cell of the fluidic cartridge Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A device comprising a fluidic cartridge, wherein the fluidic cartridge comprises:
   a first chamber to receive a sample mixture 1;
   a metering chamber for metering a first portion of the sample mixture 1, the metering chamber being connected to the first chamber; and
   a reader instrument for receiving the device and performing a sample analysis,
   wherein:
      a driving mechanism is applied to the fluidic cartridge to meter the first portion of the sample mixture 1 in the metering chamber;
      the driving mechanism is configured to drive the sample mixture 1 to contact a hydrophilic surface outside the first chamber, the hydrophilic surface being a part of a surface of the metering chamber; and
      the driving mechanism is configured to be stopped after the sample mixture 1 contacting the hydrophilic surface.

2. The device of claim 1, wherein the metering chamber comprises a capillary valve.

3. The device of claim 1, wherein the metering chamber is connected to a venting port.

4. The device of claim 1, wherein the driving mechanism is pneumatic.

5. The device of claim 1, wherein the metering chamber comprises a fluidic conduit.

6. The device of claim 1, wherein the reader instrument is configured to receive the fluidic cartridge in such an orientation that gravity pulls a fluid inside a chamber of the fluidic cartridge away from a venting port of the chamber.

7. The device of claim 1, wherein the fluidic cartridge comprises a fluidic structure configured for mixing the first portion of the sample mixture 1 with a reagent to form a sample mixture 2.

8. The device of claim 7, wherein the fluidic structure comprises a second chamber connected to the metering chamber, the second chamber being configured to receive the reagent before the reagent is mixed with the first portion of the sample mixture 1.

9. The device of claim 7, wherein the fluidic cartridge is configured for mixing a second portion of the sample mixture 1 with another reagent to form a sample mixture 3.

10. The device of claim 1, wherein the fluidic cartridge further comprises a flow cell configured to form a sample stream from a sample mixture in the fluidic cartridge.

11. A method comprising following steps:
   (a) using a fluidic cartridge to receive a sample, the fluidic cartridge comprising:
      a first chamber to receive a sample mixture 1; and
      a metering chamber for metering a first portion of the sample mixture 1, the metering chamber being connected to the first chamber; and
   (b) placing the fluidic cartridge into a reader instrument to perform sample analysis of the sample,
   wherein:
      a driving mechanism is applied to the fluidic cartridge to meter the first portion of the sample mixture 1 in the metering chamber; and
      the driving mechanism is stopped after the sample mixture 1 contacting a hydrophilic surface outside the first chamber, the hydrophilic surface being a part of a surface of the metering chamber.

12. The method of claim 11, wherein the metering chamber comprises a capillary valve.

13. The method of claim 11, wherein the metering chamber is connected to a venting port.

14. The method of claim 11, wherein the driving mechanism is pneumatic.

15. The method of claim 11, wherein the metering chamber comprises a fluidic conduit.

16. The method of claim 11, wherein the reader instrument is configured to receive the fluidic cartridge in such an orientation that gravity pulls a fluid inside a chamber of the fluidic cartridge away from a venting port of the chamber.

17. The method of claim 11, wherein the sample mixture 1 is removed from the first chamber after the first portion of the sample mixture 1 is metered.

18. The method of claim 11, wherein the fluidic cartridge comprises a fluidic structure configured for mixing the first portion of the sample mixture 1 with a reagent to form a sample mixture 2.

19. The method of claim 11, wherein the fluidic cartridge is configured for mixing a second portion of the sample mixture 1 with another reagent to form a sample mixture 3.

20. A device comprising a fluidic cartridge, wherein the fluidic cartridge comprises:
   a first chamber to receive a sample mixture 1;

a metering chamber for metering a first portion of the sample mixture 1, the metering chamber being connected to the first chamber; and a reader instrument for receiving the device and performing a sample analysis, wherein:

a driving mechanism is configured to be applied to the fluidic cartridge to meter the first portion of the sample mixture 1 in the metering chamber;

the driving mechanism is configured to drive the sample mixture 1 to contact a hydrophilic surface outside the first chamber, the hydrophilic surface being a part of a surface of the metering chamber; and the driving mechanism is configured to be stopped before the sample mixture 1 reaches a capillary valve in the metering chamber.

\* \* \* \* \*